(12) United States Patent
Sinn

(10) Patent No.: US 9,979,605 B2
(45) Date of Patent: *May 22, 2018

(54) VIRTUALIZATION MAPPING

(71) Applicant: Amazon Technologies, Inc., Seattle, WA (US)

(72) Inventor: Frederick David Sinn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/199,459

(22) Filed: Jun. 30, 2016

(65) Prior Publication Data
US 2017/0034002 A1   Feb. 2, 2017

Related U.S. Application Data

(63) Continuation of application No. 14/456,253, filed on Aug. 11, 2014, now Pat. No. 9,385,887, which is a continuation of application No. 13/169,327, filed on Jun. 27, 2011, now Pat. No. 8,804,745.

(51) Int. Cl.
| | |
|---|---|
| *H04L 12/24* | (2006.01) |
| *H04L 12/713* | (2013.01) |
| *H04L 12/751* | (2013.01) |
| *H04L 12/46* | (2006.01) |
| *H04L 12/717* | (2013.01) |

(52) U.S. Cl.
CPC .......... *H04L 41/12* (2013.01); *H04L 12/4633* (2013.01); *H04L 45/02* (2013.01); *H04L 45/42* (2013.01); *H04L 45/586* (2013.01)

(58) Field of Classification Search
None
See application file for complete search history.

(56) References Cited

U.S. PATENT DOCUMENTS

| | | | | |
|---|---|---|---|---|
| 7,373,660 | B1 * | 5/2008 | Guichard | ............... H04L 47/10 726/15 |
| 7,937,438 | B1 * | 5/2011 | Miller | .................... H04L 41/12 370/397 |
| 2008/0240122 | A1 | 10/2008 | Richardson et al. | |

(Continued)

*Primary Examiner* — Kodzovi Acolatse
(74) *Attorney, Agent, or Firm* — Knobbe Martens Olson & Bear LLP

(57) ABSTRACT

Systems and methods for the management of virtual machine instances are provided. The hosted virtual machine networks are configured in a manner such that communications within the hosted virtual machine network are facilitated through a communication protocol. Illustrative embodiments of the systems and methods may be implemented on a virtual network overlaid on one or more intermediate physical networks that are used as a substrate network. Through the utilization of one or more virtual network mapping components in communication with the hosted virtual network components, communications to and from the hosted virtual networks can be processed by mapping relationships between the virtual network communication protocol and the router communication protocol. The mapping information can be provided in advance or as requested to the router components and hosted virtual network components to facilitate bi-lateral communications between the components.

20 Claims, 20 Drawing Sheets

(56) References Cited

U.S. PATENT DOCUMENTS

2009/0323706 A1* 12/2009 Germain ............. H04L 67/1097
                                                      370/401
2011/0075674 A1    3/2011 Li et al.
2014/0359620 A1* 12/2014 Van Kerkwyk ....... H04L 41/042
                                                        718/1

* cited by examiner

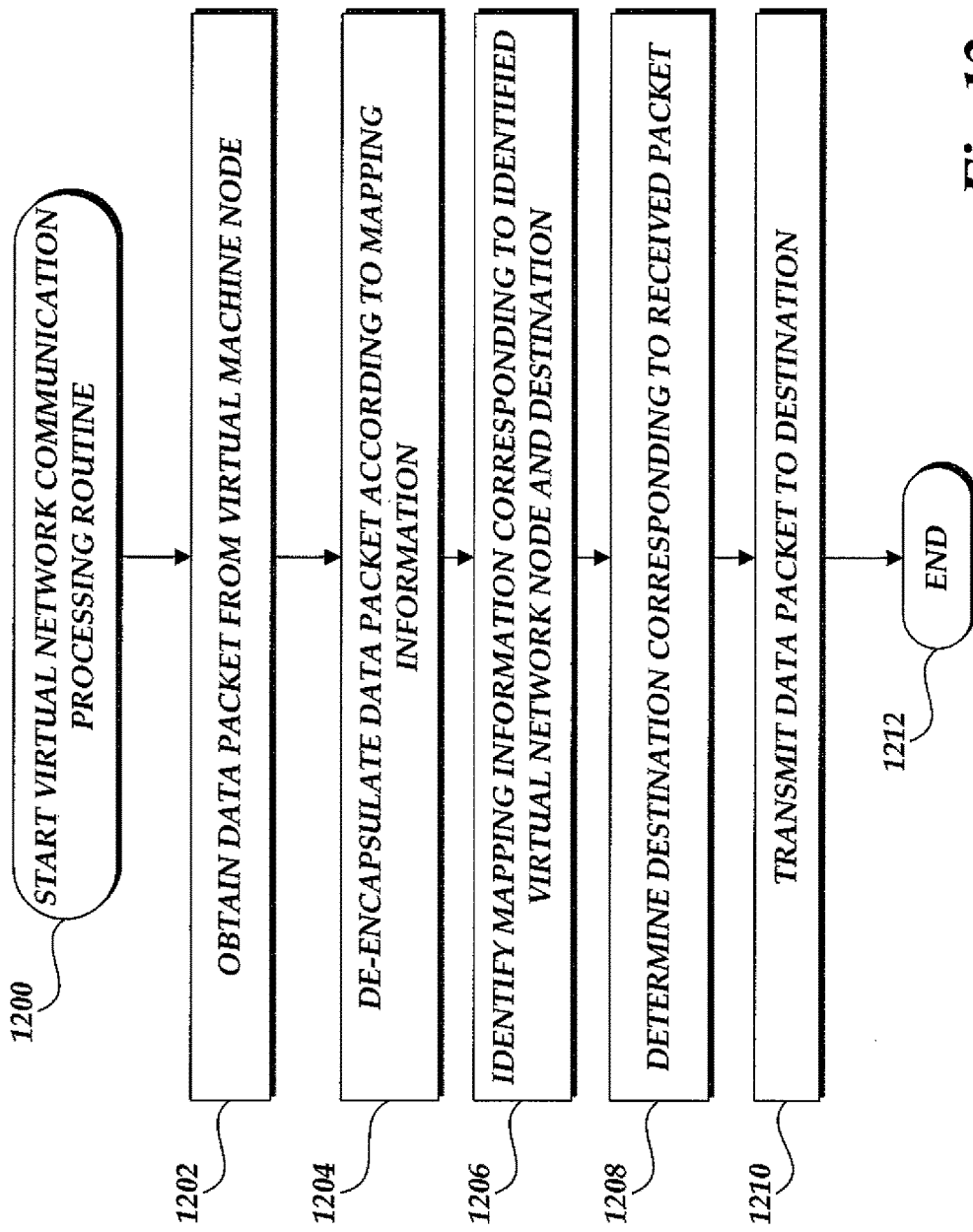

VIRTUALIZATION MAPPING

CROSS-REFERENCE TO RELATED APPLICATIONS

This application is a continuation of U.S. patent application Ser. No. 14/456,253, entitled "VIRTUALIZATION MAPPING," filed Aug. 11, 2014, and soon to issue as U.S. Pat. No. 9,385,887, which is a continuation of U.S. patent application Ser. No. 13/169,327, entitled "VIRTUALIZATION MAPPING," filed Jun. 27, 2011, and issued as U.S. Pat. No. 8,804,745, the entireties of which are hereby incorporated herein by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

Generally, the physical communication networks include a number of hardware devices that receive packets from a source network component and forward the packet to a recipient network component. The packet routing hardware devices are typically referred to as routers. However, hosted virtual machine network components can have difficulty exchanging information in situations in which the hosted virtual networks must communicate with the external networks, through routers, via standard routing protocols, while utilizing different, often proprietary routing protocols within the hosted virtual network.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 12 is a flow diagram of a virtual network communication processing routing implemented by a virtual network mapping component.

DETAILED DESCRIPTION

Figure 1:
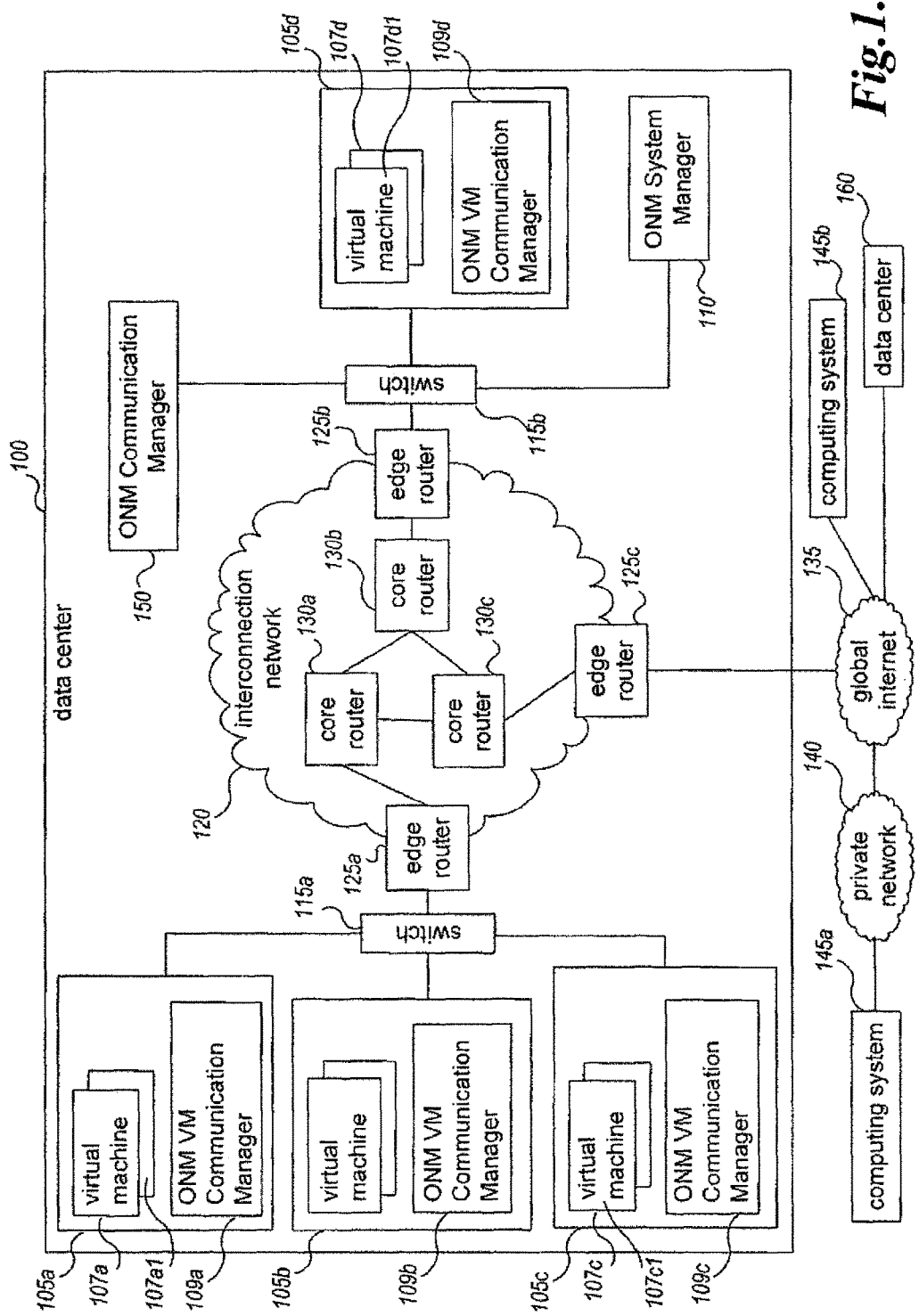
FIG. 1 is a block diagram illustrating an embodiment of a substrate network having computing nodes associated with a virtual computer network.

Generally described, aspects of the present disclosure relate to the management of virtual machine instances. Specifically, embodiments of network data transmission analysis systems and methods are disclosed for managing communications between hosted virtual machine networks and external network. The hosted virtual machine networks are configured in a manner such that communications within the hosted virtual machine network are facilitated through a virtual network communication protocol. Illustrative embodiments of the systems and methods may be implemented on a virtual network overlaid on one or more intermediate physical networks that are used as a substrate network and which are configured to communicate in accordance with the virtual network communication protocol, which may be a standard routing or communication protocol. One or more router component of a communication network can be configured to facilitate communication through a router communication protocol, which may also be a standard routing or communication protocol. One or more virtual network mapping components can be implemented to map relationships between the virtual network communication protocol and the router communication protocol. The mapping information can be provided in advance or as requested to the router components and hosted virtual network components to facilitate bi-lateral communications between the components.

The following section discusses various embodiments of managed networks for network data transmission analysis.

Following that is further discussion of network data transmission analysis systems and methods that can implement management methodologies.

Managed Computer Networks for Network Data Transmission Analysis

With the advent of virtualization technologies, networks and routing for those networks can now be simulated using commodity hardware components. For example, virtualization technologies can be adapted to allow a single physical computing machine to be shared among multiple virtual networks by hosting one or more virtual machines on the single physical computing machine. Each such virtual machine can be a software simulation acting as a distinct logical computing system that provides users with the illusion that they are the sole operators and administrators of a given hardware computing resource. In addition, as routing can be accomplished through software, additional routing flexibility can be provided to the virtual network in comparison with traditional routing. As a result, in some implementations, supplemental information other than packet information can be used to determine network routing.

Aspects of the present disclosure will be described with regard to illustrative logical networking functionality for managed computer networks, such as for virtual computer networks that are provided on behalf of users or other entities. In at least some embodiments, the techniques enable a user to configure or specify a network topology, routing costs, routing paths, and/or other information for a virtual or overlay computer network including logical networking devices that are each associated with a specified group of multiple physical computing nodes. For example, a user (e.g., a network administrator for an organization) or service provider may configure a virtual or overlay network based on detected events, processing criteria, or upon request. With the network configuration specified for a virtual computer network, the functionally and operation of the virtual network can be simulated on physical computing nodes operating virtualization technologies. In some embodiments, multiple users or entities (e.g. businesses or other organizations) can access the system as tenants of the system, each having their own virtual network in the system. In one embodiment, a user's access and/or network traffic is transparent to other users. For example, even though physical components of a network may be shared, a user of a virtual network may not see another user's network traffic on another virtual network if monitoring traffic on the virtual network.

Figure 2:
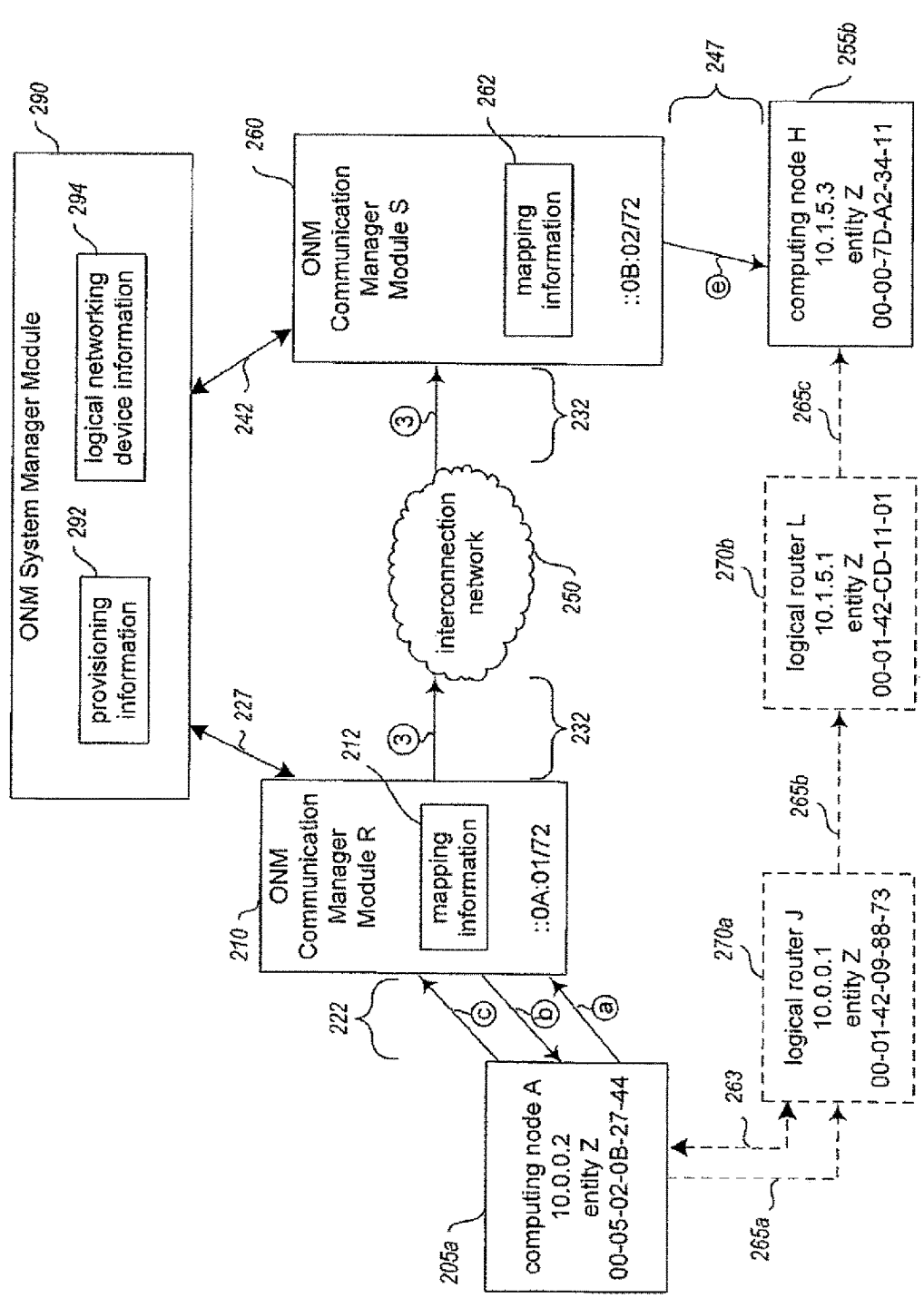
FIG. 2 is a block diagram of the substrate network of FIG. 1 illustrating logical networking functionality.

By way of overview, FIGS. 1 and 2 discuss embodiments where communications between multiple computing nodes of the virtual computer network emulate functionality that would be provided by logical networking devices if they were physically present. In some embodiments, some or all of the emulation are performed by an overlay network manager system. FIGS. 2-4B and 7B discuss embodiments where substrate routing decisions can be made independently of any simulated routing in the overlay network, allowing, for example, optimization of traffic on the substrate network based on information unavailable to a virtual network user. FIGS. 5A-7A discuss embodiments where routing decisions implemented on the virtual or overlay network are propagated to the substrate network. One skilled in the relevant art will appreciate, however, that the disclosed virtual computer network is illustrative in nature and should not be construed as limiting.

Overlay Network Manager

FIG. 1 is a network diagram illustrating an embodiment of an overlay network manager system (ONM) for managing computing nodes associated with a virtual computer network. Virtual network communications can be overlaid on one or more intermediate physical networks in a manner transparent to the computing nodes. In this example, the ONM system includes a system manager module 110 and multiple communication manager modules 109a, 109b, 109c, 109d, 150 to facilitate the configuring and managing communications on the virtual computer network.

The illustrated example includes an example data center 100 with multiple physical computing systems operated on behalf of the ONM system. The example data center 100 is connected to a global internet 135 external to the data center 100. The global internet can provide access to one or more computing systems 145a via private network 140, to one or more other globally accessible data centers 160 that each have multiple computing systems, and to one or more other computing systems 145b. The global internet 135 can be a publicly accessible network of networks, such as the Internet, and the private network 140 can be an organization's network that is wholly or partially inaccessible from computing systems external to the private network 140. Computing systems 145b can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105a-105d and a Communication Manager module 150 that executes on one or more other computing systems. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machines 107a on host computing system 105a, and VM Communication Manager module 109d and virtual machines 107d on host computing system 105d.

This illustrative data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes the System Manager module 110, and is connected to edge router 125b. The physical sub-networks established by switches 115a-115b, in turn, are connected to each other and other networks (e.g., the global internet 135) via an intermediate communication network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The System Manager module 110 and Communication Manager module 109 can configure, authorize, and otherwise manage communications between associated computing nodes, including providing logical networking functionality for one or more virtual computer networks that are provided using the computing nodes. For example, Communication Manager module 109*a* and 109*c* manages associated virtual machine computing nodes 107*a* and 107*c* and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Furthermore, a particular virtual network can optionally be extended beyond the data center 100, such as to one or more other data centers 160 which can be at geographical locations distinct from the first data center 100. Such data centers or other geographical locations of computing nodes can be inter-connected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107*a*1 on computing system 105*a* can be part of the same virtual local computer network as one of the virtual machine computing nodes 107*d*1 on computing system 105*d*. The virtual machine 107*a*1 can then direct an outgoing communication to the destination virtual machine computing node 107*d*1, such as by specifying a virtual network address for that destination virtual machine computing node. The Communication Manager module 109*a* receives the outgoing communication, and in at least some embodiments determines whether to authorize the sending of the outgoing communication. By filtering unauthorized communications to computing nodes, network isolation and security of entities' virtual computer networks can be enhanced.

The Communication Manager module 109*a* can determine the actual physical network location corresponding to the destination virtual network address for the communication. For example, the Communication Manager module 109*a* can determine the actual destination network address by dynamically interacting with the System Manager module 110, or can have previously determined and stored that information. The Communication Manager module 109*a* then re-headers or otherwise modifies the outgoing communication so that it is directed to Communication Manager module 109*d* using an actual substrate network address.

When Communication Manager module 109*d* receives the communication via the interconnection network 120, it obtains the virtual destination network address for the communication (e.g., by extracting the virtual destination network address from the communication), and determines to which virtual machine computing nodes 107*d* the communication is directed. The Communication Manager module 109*d* then re-headers or otherwise modifies the incoming communication so that it is directed to the destination virtual machine computing node 107*d*1 using an appropriate virtual network address for the virtual computer network, such as by using the sending virtual machine computing node 107*a*1's virtual network address as the source network address and by using the destination virtual machine computing node 107*d*1's virtual network address as the destination network address. The Communication Manager module 109*d* then forwards the modified communication to the destination virtual machine computing node 107*d*1. In at least some embodiments, before forwarding the incoming communication to the destination virtual machine, the Communication Manager module 109*d* can also perform additional steps related to security.

Further, the Communication Manager modules 109*a* and/or 109*c* on the host computing systems 105*a* and 105*c* can perform additional actions that correspond to one or more logical specified router devices lying between computing nodes 107*a*1 and 107*c*1 in the virtual network topology. For example, the source computing node 107*a*1 can direct a packet to a logical router local to computing node 107*a*1 (e.g., by including a virtual hardware address for the logical router in the packet header), with that first logical router being expected to forward the packet to the destination node 107*c*1 via the specified logical network topology. The source Communication Manager module 109*a* receives or intercepts the packet for the logical first router device and can emulate functionality of some or all of the logical router devices in the network topology, such as by modifying a TTL ("time to live") hop value for the communication, modifying a virtual destination hardware address, and/or otherwise modify the communication header. Alternatively, some or all the emulation functionality can be performed by the destination Communication Manager module 109*c* after it receives the packet.

By providing logical networking functionality, the ONM system provides various benefits. For example, because the various Communication Manager modules manage the overlay virtual network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115*a*-115*b* are generally not needed to support particular configured network topologies. Nonetheless, a particular network topology for the virtual computer network can be transparently provided to the computing nodes and software programs of a virtual computer network.

Logical/Virtual Networking

FIG. 2 illustrates a more detailed implementation of the ONM system of FIG. 1 supporting logical networking functionality. The ONM system includes more detailed embodiments of the ONM System Manager and ONM Communication Manager of FIG. 1. In FIG. 2, computing node A is sending a communication to computing node H, and the actions of the physically implemented modules 210 and 260 and devices of network 250 in actually sending the communication are shown, as well as emulated actions of the logical router devices 270*a* and 270*b* in logically sending the communication.

In this example, computing nodes A 205*a* and H 255*b* are part of a single virtual computer network for entity Z. However, computing nodes can be configured to be part of two distinct sub-networks of the virtual computer network and the logical router devices 270*a* and 270*b* separate the computing nodes A and H in the virtual network topology. For example, logical router device J 270*a* can be a local router device to computing node A and logical router device L 270b can be a local router device to computing node H.

In FIG. 2, computing nodes A 205a and H 255b includes hardware addresses associated with those computing nodes for the virtual computer network, such as virtual hardware addresses that are assigned to the computing nodes by the System Manager module 290 and/or the Communication Manager modules R 210 and S 260. In this example, computing node A has been assigned hardware address "00-05-02-0B-27-44," and computing node H has been assigned hardware address "00-00-7D-A2-34-11." In addition, the logical router devices J and L have also each been assigned hardware addresses, which in this example are "00-01-42-09-88-73" and "00-01-42-CD-11-01," respectively, as well as virtual network addresses, which in this example are "10.0.0.1" and "10.1.5.1," respectively. The System Manager module 290 maintains provisioning information 292 that identifies where each computing node is actually located and to which entity and/or virtual computer network the computing node belongs.

this example, computing node A 205a first sends an address resolution protocol (ARP) message request 222-*a* for virtual hardware address information, where the message is expected to first pass through a logical device J before being forwarded to computing node H. Accordingly, the ARP message request 222-*a* includes the virtual network address for logical router J (e.g., "10.0.0.1") and requests the corresponding hardware address for logical router J.

Communication Manager module R intercepts the ARP request 222-*a*, and obtains a hardware address to provide to computing node A as part of spoofed ARP response message 222-*b*. The Communication Manager module R can determine the hardware address by, for example, looking up various hardware address information in stored mapping information 212, which can cache information about previously received communications. Communication Manager module R can communicate 227 with the System Manager module 290 to translate the virtual network address for logical router J.

The System Manager module 290 can maintain information 294 related to the topology and/or components of virtual computer networks and provide that information to Communication Manager modules. The Communication Manager module R can then store the received information as part of mapping information 212 for future use. Communication Manager module R then provides computing node A with the hardware address corresponding to logical router J as part of response message 222-*b*. While request 222-*a* and response message 222-*b* actually physically pass between computing node A and Communication Manager module R, from the standpoint of computing node A, its interactions occur with local router device J.

After receiving the response message 222-*b*, computing node A 205a creates and initiates the sending of a communication 222-*c* to computing node H 255b. From the standpoint of computing node A, the sent communication will be handled as if logical router J 270a were physically implemented. For example, logical router J could modify the header of the communication 265a and forward the modified communication 265b to logical router L 270a, which would similarly modify the header of the communication 265b and forward the modified communication 265c to computing node H. However, communication 222-*c* is actually intercepted and handled by Communication Manager module R, which modifies the communication as appropriate, and forwards the modified communication over the interconnection network 250 to computing node H by communication 232-3. Communication Manager module R and/or Communication Manager module S may take further actions in this example to modify the communication from computing node A to computing node H or vice versa to provide logical networking functionality. For example, Communication Manager module S can provides computing node H with the hardware address corresponding to logical router L as part of response message 247-*e* by looking up the hardware address in stored mapping information 262. In one embodiment, a communication manager or computing node encapsulates a packet with another header or label where the additional header specifies the route of the packet. Recipients of the packet can then read the additional header and direct the packet accordingly. A communication manager at the end of the route can remove the additional header.

A user or operator can specify various configuration information for a virtual computer network, such as various network topology information and routing costs associated with the virtual 270a, 270b and/or substrate network 250. In turn, the ONM System Manager 290 can select various computing nodes for the virtual computer network. In some embodiments, the selection of a computing node can be based at least in part on a geographical and/or network location of the computing node, such as an absolute location or a relative location to a resource (e.g., other computing nodes of the same virtual network, storage resources to be used by the computing node, etc.). In addition, factors used when selecting a computing node can include: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; or the like.

Route Selection on Substrate Network

Figure 3:
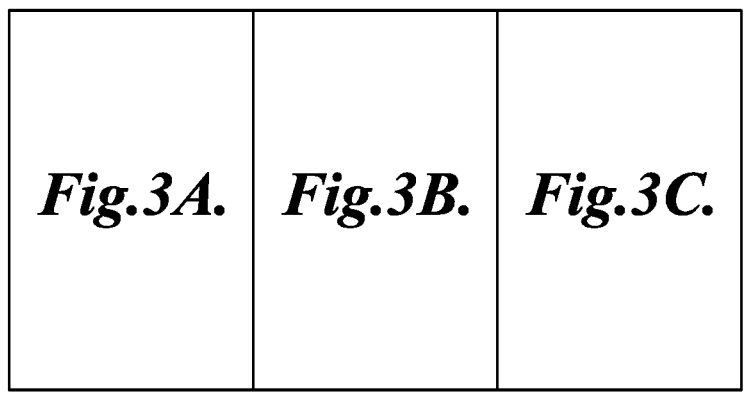
FIG. 3 is a block diagram of the substrate network of FIG. 1 illustrating a substrate network configuration associated with overlay networks.
Figure 3A:
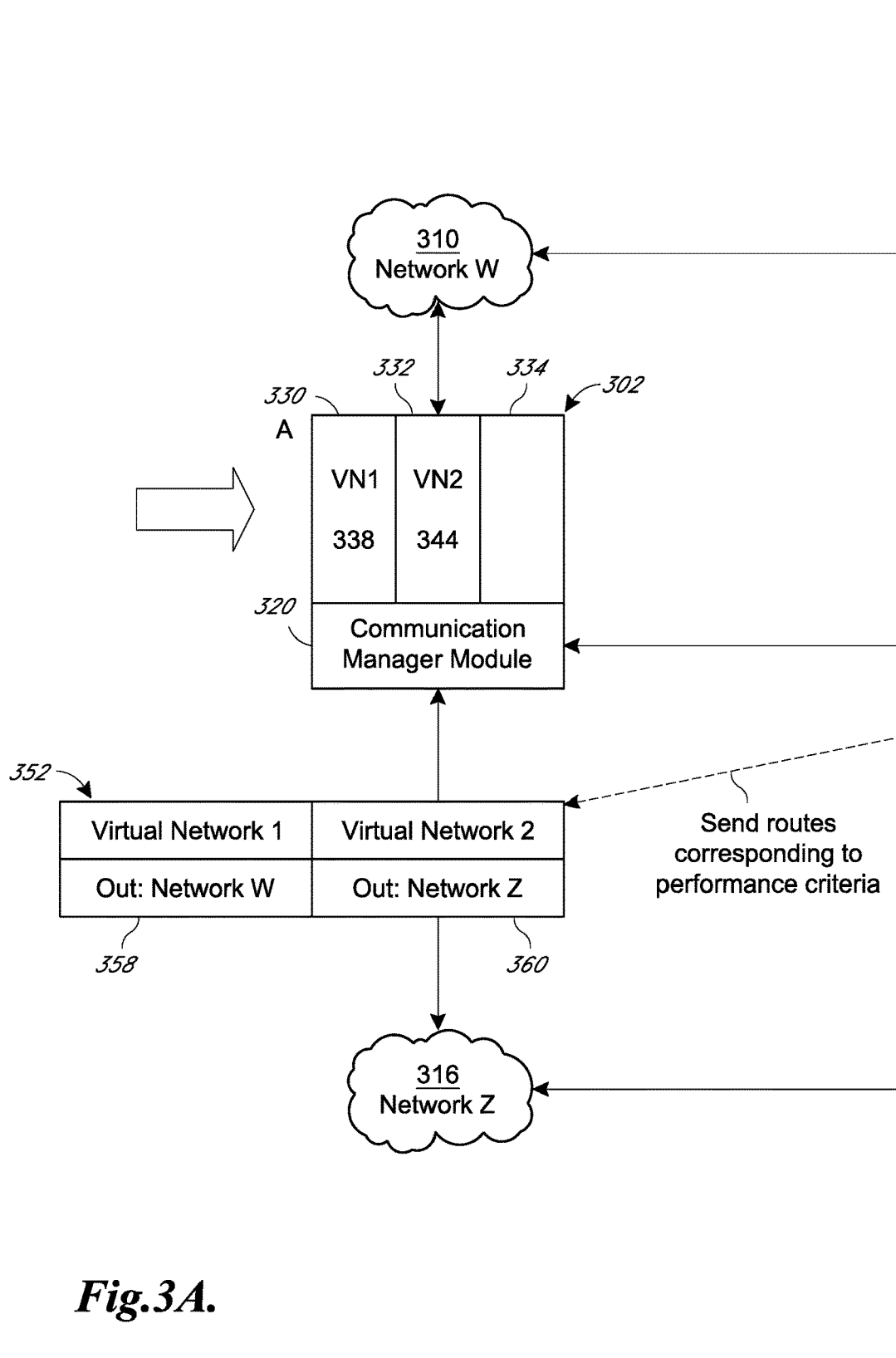
Figure 3B:
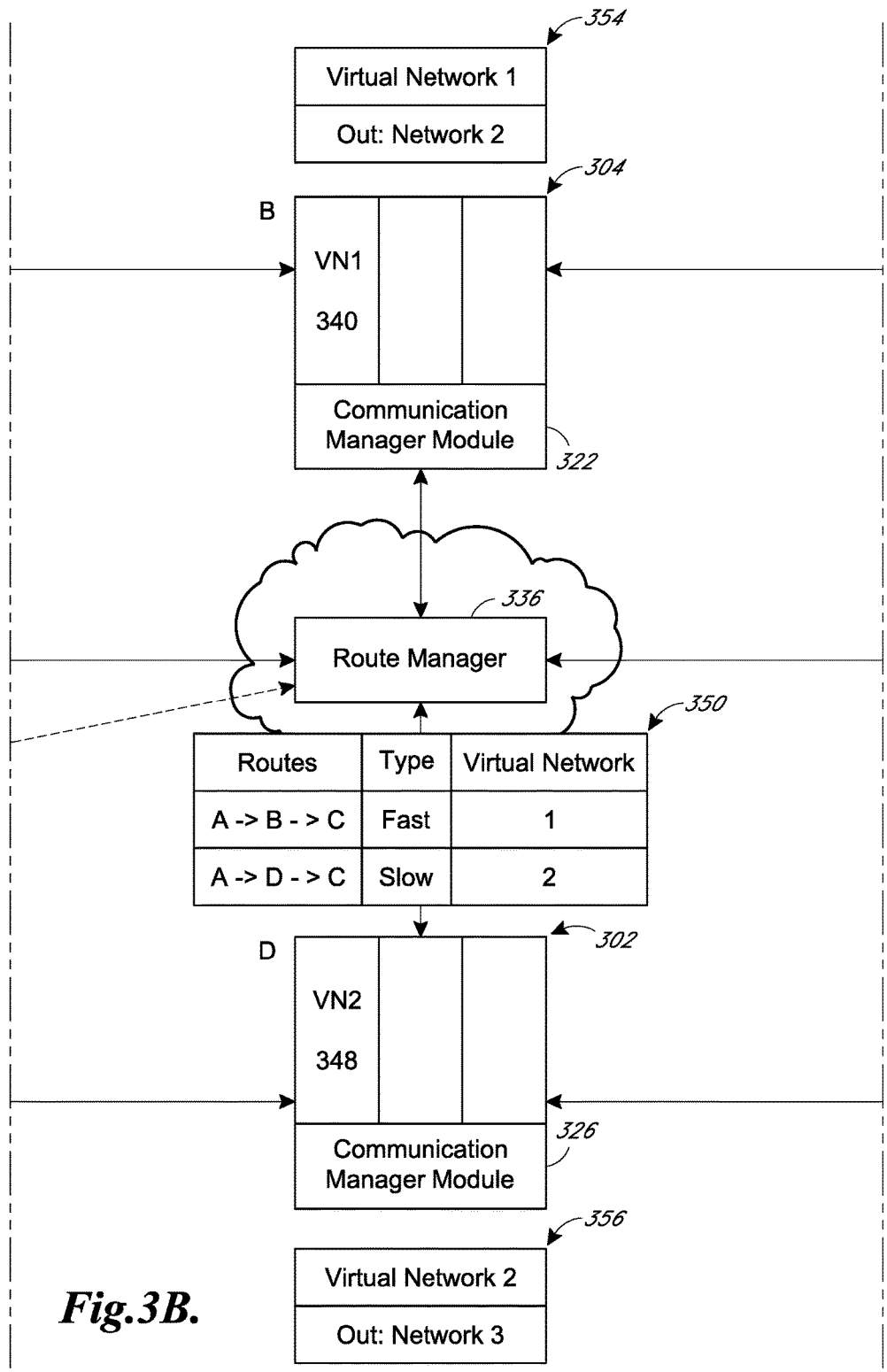
Figure 3C:
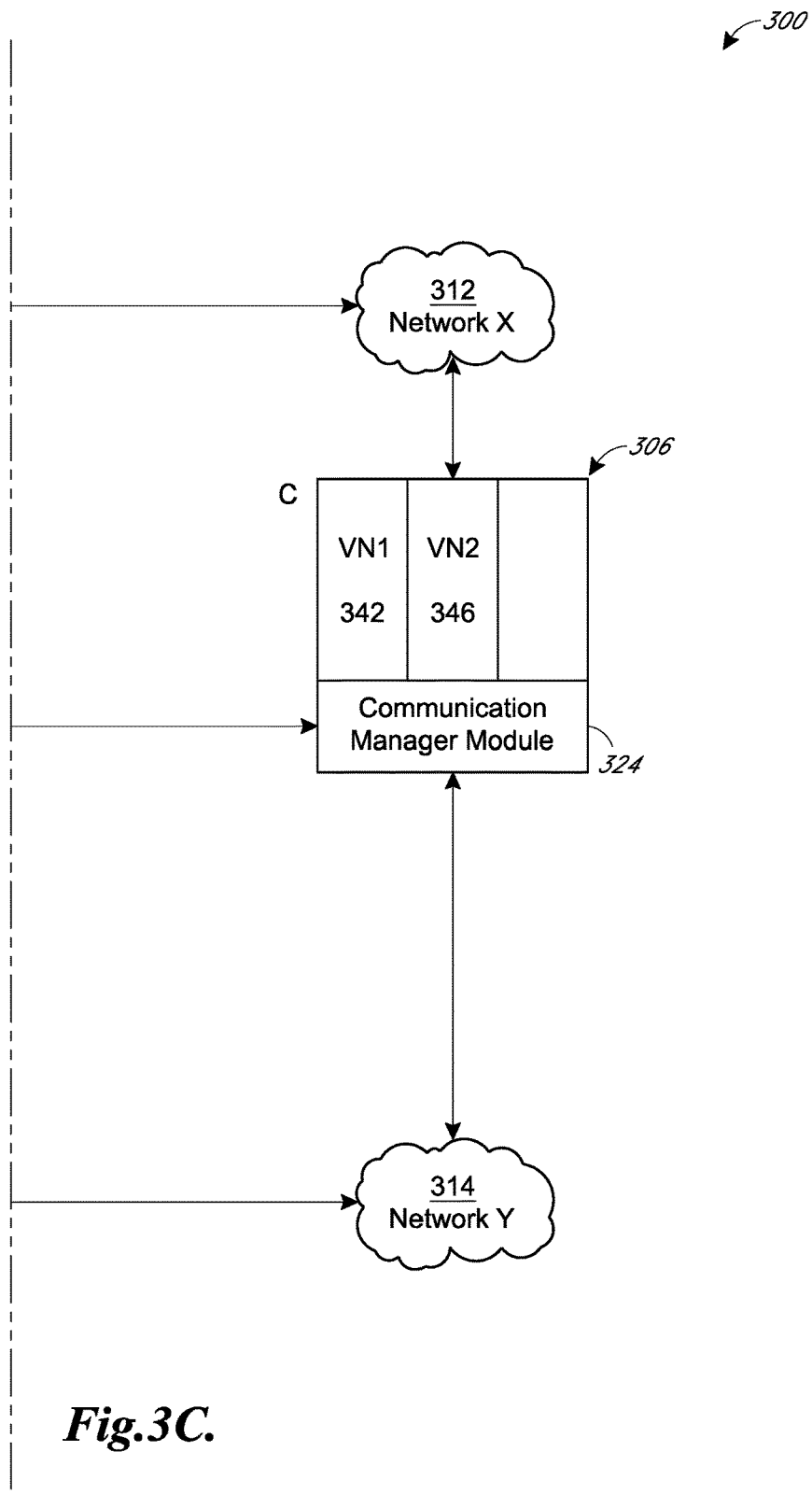

FIG. 3 illustrates an example embodiment of a substrate network 300 having a route manager 336 capable of determining routes for overlay networks. The substrate network 300 can be composed of one or more substrate components or nodes, such as computing nodes, routing nodes, communication links or the like. In FIG. 3, the substrate network 300 includes computing nodes A 302, B 304, C 306, and D 308, which are capable of simulating various components of one or more associated overlay networks. The nodes can be located on the same data center or in multiple data centers. Computing node A is interconnected to node B via network W 310, node B is connected to node C by network X 312, node C is connected to node D by network Y 314, and node D is connected to node A by network Z 316. Networks W, X, Y, and Z can include one or more physical networking devices, such as routers, switches, or the like, and can include private or public connections. Components shown in FIG. 3, such as the computing nodes and communication manager modules, can implement certain of the features of embodiments described above with respect to FIGS. 1 and 2.

In FIG. 3, nodes A 302, B 304, C 306, and D 308 are associated with a respective Communication Manager module 320, 322, 324, and 326. The communication manager modules can implement certain of the features described in the Communication Manager 150, 210, 260 and VM Communication manager 109a, 109b, 109c, 109d of FIGS. 1 and 2. For example, the Communication Manager module 320 for node A can operate on a hypervisor monitor of the computing node and can direct the communication of one or more virtual computing nodes 330, 332, 334 of node A. The computing nodes, communication managers and Route Manager 336 can be part of the same ONM system. In one embodiment, the computing nodes run the XEN operating system (OS) or similar virtualization OS, with the communication managers operating on domain 0 or the first OS instance and the virtual computing nodes being domain U or additional OS instances.

The communication manager modules in FIG. 3 are in communication with a Route Manager module 336, operating on one or more computing devices, that directs routing for the substrate network 300. In one embodiment, the Route Manager operates as part of the ONM System Manager module 110, 290 of FIGS. 1 and 2, with functionally combined into a single module. The Route Manager can be located within a data center or at a regional level and direct traffic between data centers. In one embodiment, multiple Route Managers can operate in a distributed manner to coordinate routing across multiple data centers.

In FIG. 3, two virtual networks are associated with the substrate network 300. Virtual network 1 (VN1) has components 338, 340, 342, associated with virtual computing nodes on computing nodes A 302, B 304, and C 306. Virtual network 2 (VN2) has components 344, 346, 348 associated with virtual computing nodes on nodes A, C, and D 308.

As the Routing Manager module 336 directs network traffic on the substrate network 300, traffic can be directed flexibly and various network configurations and network costs can be considered. For example, routing paths can be determined based on specified performance levels for the virtual networks. In one embodiment, if the user for VN1 is entitled to a higher service level, such as for faster speed (e.g. lower latency and/or higher bandwidth), traffic associated with VN1 can be routed on a "fast" path of the substrate network 300. For example, in one embodiment, traffic for "platinum" users is prioritized over traffic for "gold" and "silver" users, with traffic from "gold" users prioritized over "silver" users. In one embodiment, at least some packets of the user with the higher service level are prioritized over packets of a user with a lower service level, for example, during times of network congestion. The user may be entitled to a higher service level because the user has purchased the higher service level or earned the higher service level through good behavior, such as by paying bills, complying with the operator's policies and rules, not overusing the network, combinations of the same, or the like.

The Route Manager 336 can store user information or communicate with a data store containing user information in order to determine the target performance level for a virtual network. The data store can be implemented using databases, flat files, or any other type of computer storage architecture and can include user network configuration, payment data, user history, service levels, and/or the like. Typically, the Route Manager will have access to node and/or link characteristics for the substrate nodes and substrate links collected using various network monitoring technologies or routing protocols. The Route Manager can then select routes that correspond to a selected performance level for the virtual network and send these routes to the computing nodes. For example, network W 310 and Y 312 can be built on fiber optic lines while network Y 314 and Z 316 are built on regular copper wire. The Route Manager can receive network metrics data and determine that the optical lines are faster than the copper wires (or an administrator can designate the optical lines as a faster path). Thus, the Route Manager, in generating a route between node A 302 and node C 306 for "fast" VN1 traffic, would select a path going through network W and Y (e.g., path A-B-C).

In another situation, where the user for VN2 is not entitled to a higher service level, VN2 traffic from node A 302 to node B 306 can be assigned to a "slow" or default path through network Y 314 and Z 316 (e.g. path A-D-C). In order to track routing assignments, the Routing Manager can maintain the routes and/or route association in a data store, such as a Routing Information Base (RIB) or routing table 350. The Route Manager can also track the target performance criteria 351 associated with a particular virtual network.

In order to direct network traffic on the substrate network 300, the Routing Manager 336 can create forwarding entries for one or more of the Communication Manager modules 320, 322, 324, 326 that direct how network traffic is routed by the Communication Manager. The Communication Manager modules can store those entries in forwarding tables 352, 354, 356, or other similar data structure, associated with a Communication Manager. For example, for VN1, the Route Manager can generate a control signal or message, such as a forwarding entry 358, that directs VN1 traffic received or generated on node A 302 through network W 310 (on path A-B-C). Meanwhile, for VN2, the Route Manager can generate a control signal or message, such as a forwarding entry 360, which directs traffic received on node A through network Z. The Route Manager can send these forwarding entries to the node A Communication Manager 320, which can store them on its forwarding table 352. Thus, network traffic associated with VN1 and VN2, destined for node C 306 received or generated on node A can travel by either path A-B-C or path A-D-C based on the designated performance level for VN1 and VN2.

While the example of FIG. 3 depicts only two virtual networks, the Route Manager 336 can similarly generate and maintain routes for any number of virtual networks. Likewise, the substrate network 300 can include any number of computing nodes and/or physical network devices. Routes can be determined based on multiple performance criteria, such as network bandwidth, network security, network latency, and network reliability. For example, traffic for a virtual network suspected of being used for spamming (e.g. mass advertisement emailing) can be routed through network filters and scanners in order to reduce spam.

Figure 4A:
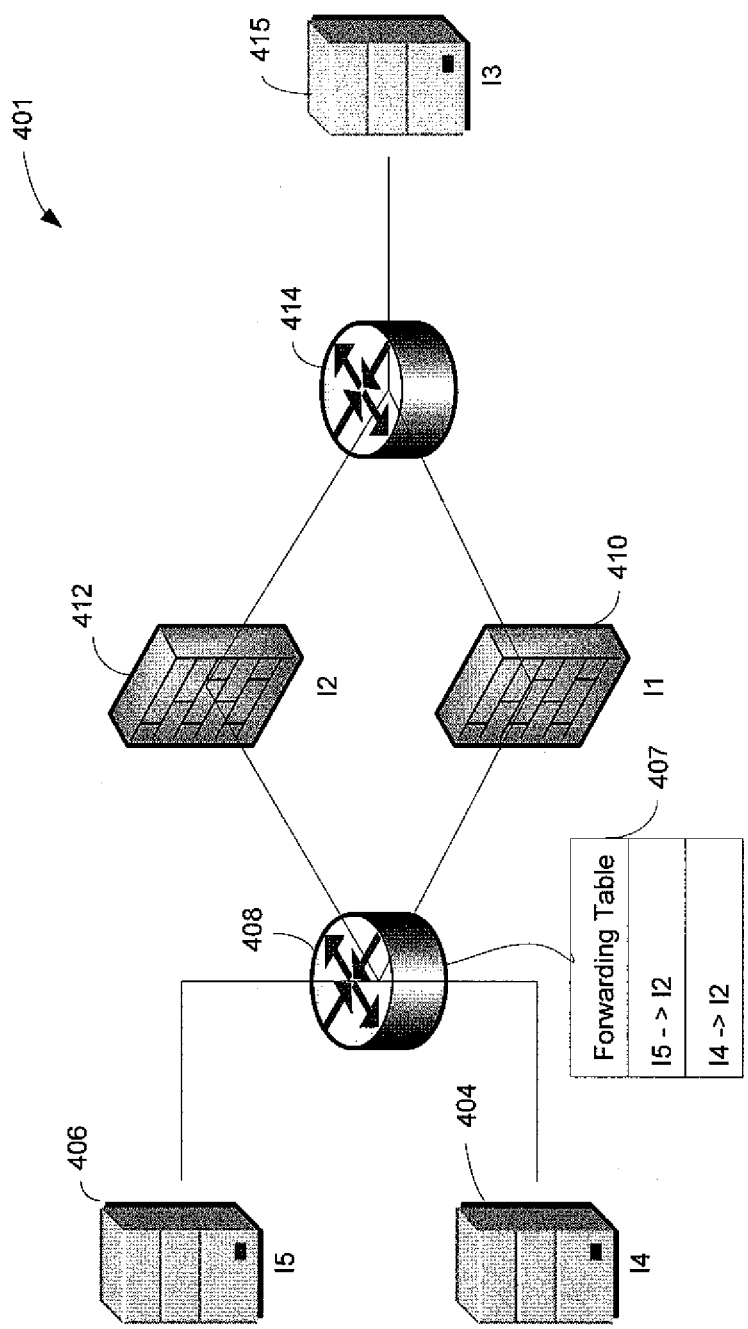
FIGS. 4A and 4B are block diagrams of the substrate network of FIG. 1 illustrating independently determined substrate routing.
Figure 4B:
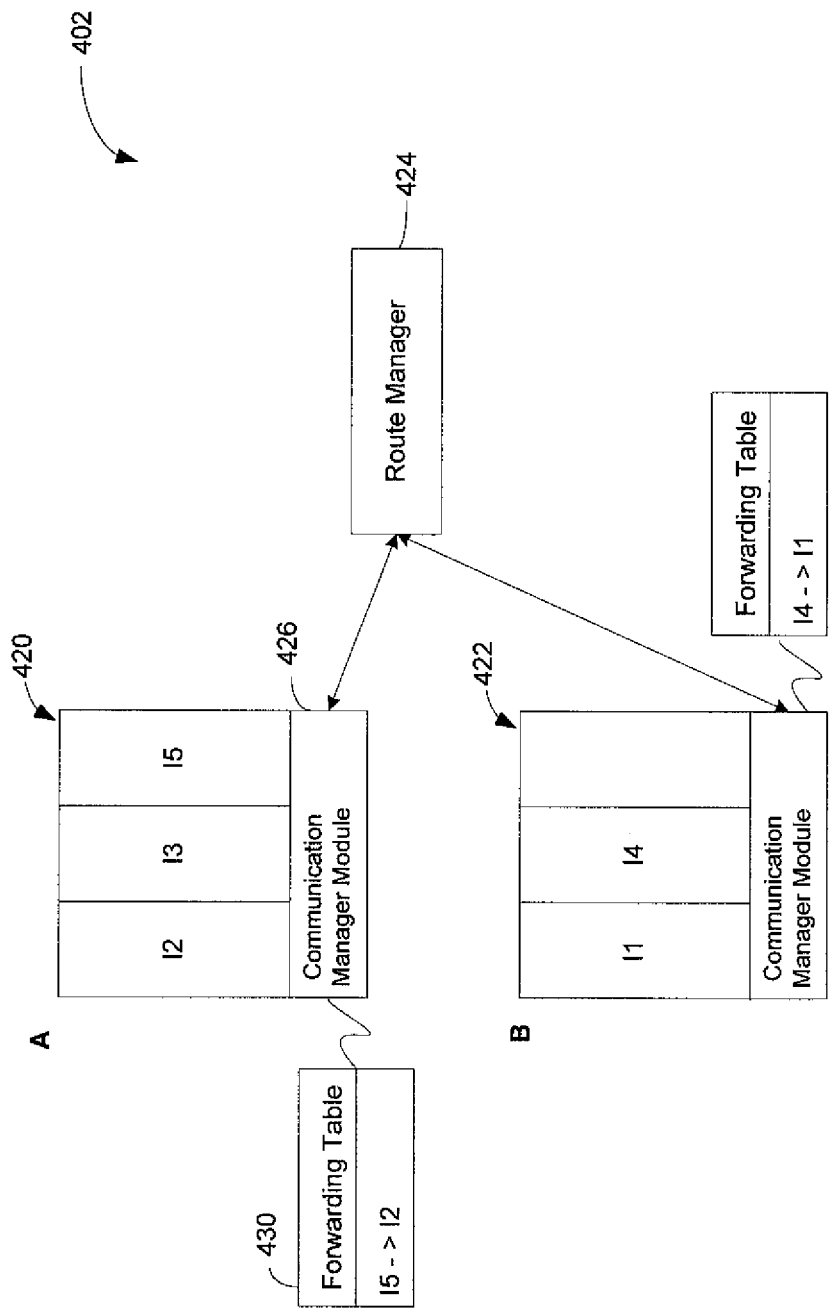

FIGS. 4A and 4B illustrate a virtual network 401 and corresponding substrate network 402 where substrate routing is independently determined from virtual routing. FIG. 4A illustrates a virtual network including several virtual network components. Virtual computing nodes I4 404 and I5 406 are connected to a logical router 408. The logical router can implement certain of the features described in the logical router 270a, 270b of FIG. 2. The logical router is connected to firewalls I1 410 and I2 412. The logical router is configured to direct traffic from I5 to I2 and I4 to I2, as would be the case if I2 were a backup firewall. The forwarding table associated with logical router 409 reflects this traffic configuration. I1 and I2 are connected to a second router 414. The second router is connected to another virtual computing node, I3 415. Thus, based on the topology and associated forwarding table of the virtual network 401, traffic from I4 and I5 to I3 passed through I2.

FIG. 4B illustrates an example topology of the substrate network 402 associated with the virtual network 401. The substrate network includes computing node A 420, computing node B, and a Route Manager 424. Substrate nodes A and B are each associated with a Communication Manager 426, 428. Node A is simulating the operation of virtual components I2, I3, and I5 while Node B is simulating the operation of virtual components on I1 and I4 on their respective virtual machines. The Route Manager can then use information regarding the assignments of virtual components to computing nodes to optimize or otherwise adjust routing tables for the substrate network. The Route Manager can receive such information from the Communication Managers and/or the System Manager. For example, assuming I1 and I2 are identical virtual firewalls, the Route Manager can determine that because I5 and I2 are located on the same computing node, while I4 and I1 are located on the other node, virtual network traffic can be routed from I5 to I2 and from I4 to I1 without leaving the respective computing node, thus reducing traffic on the network. Such a configuration is reflected in the illustrated forwarding tables 430, 432 associated with the Communication Managers. Thus, routes on the substrate network can be determined independently of virtual network routes.

In some embodiments, the Route Manager 424 or System Manager can optimize or otherwise improve network traffic using other techniques. For example, with reference to FIGS. 4A and 4B, another instance of I3 can be operated on node B 422, in addition to the instance of I3 on node A. Thus, virtual network traffic from I5-I2-I3 and I4-I1-I3 can remain on the same computing node without having to send traffic between computing nodes A and B. In one embodiment, substrate traffic can be optimized or otherwise improved without having different forwarding entries on the substrate and the virtual network. For example, with reference to FIG. 4B, I4 can be moved from computing node B 422 to node A 420, thus allowing virtual traffic from I5 and I4 to I2 to remain on the same computing node. In this way, a user monitoring traffic on logical router 408 would see that traffic is flowing according the forwarding table in the router, that is, substrate routing is transparent to the user. Other techniques for optimizing traffic by changing the association of virtual components with virtual machines and/or duplicating components can also be used.

In some situations, it can be desired that substrate routes reflect routes specified in the virtual table. For example, the virtual network user can wish to control how traffic is routed in the substrate network. However, rather than giving the user access to the substrate network, which could put other users at risk or otherwise compromise security, a data center operator can propagate network configuration or virtual network characteristics specified by the user for the virtual network to the substrate network. This propagated data can be used in generating routing paths in the substrate network, thus allowing the user to affect substrate routing without exposing the substrate layer to the user.

Route Selection on Overlay/Virtual Network

Figure 5A:
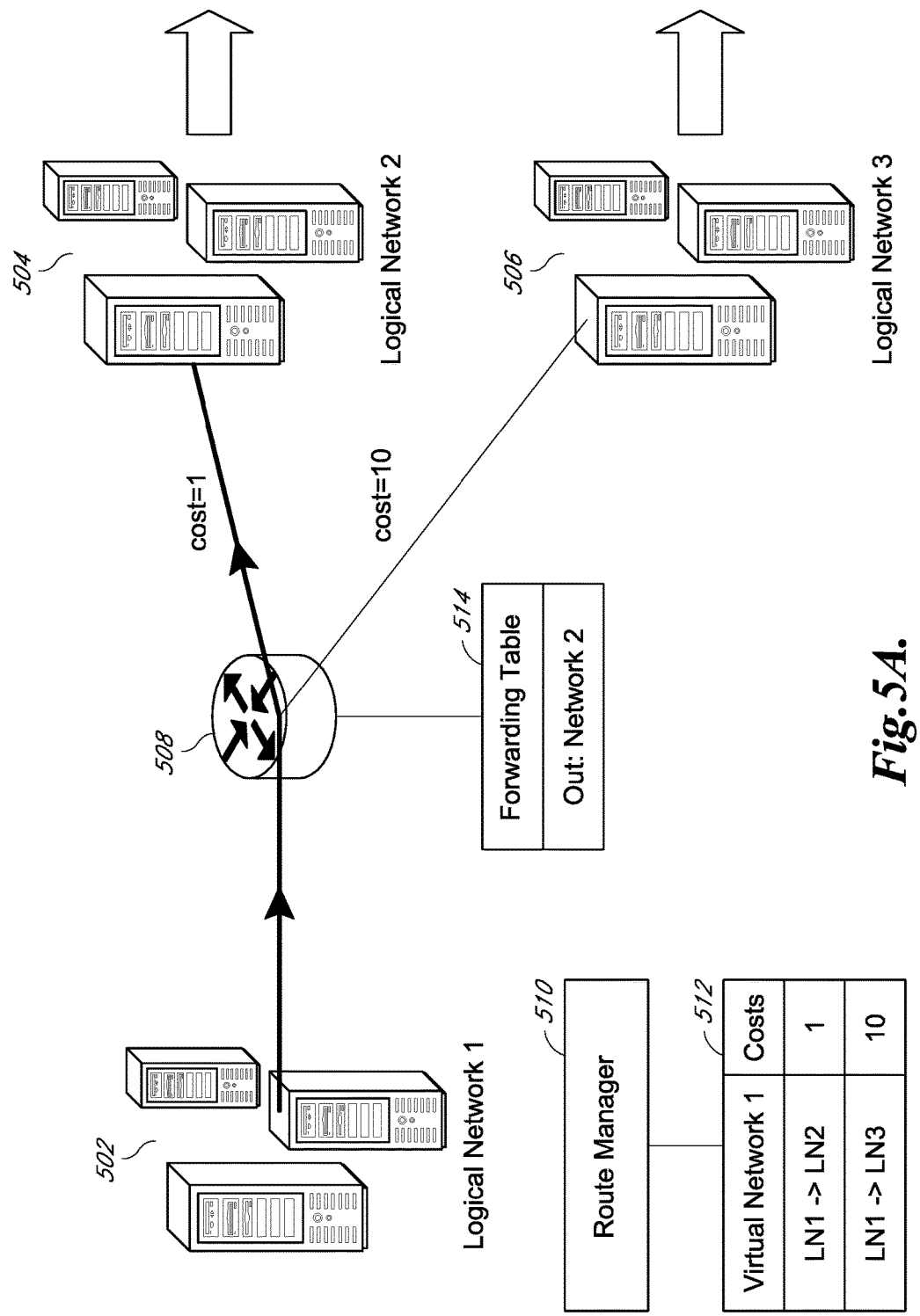
FIGS. 5A and 5B are block diagrams of the substrate network of FIG. 1 illustrating virtual route selection propagation to the substrate network.
Figure 5B:
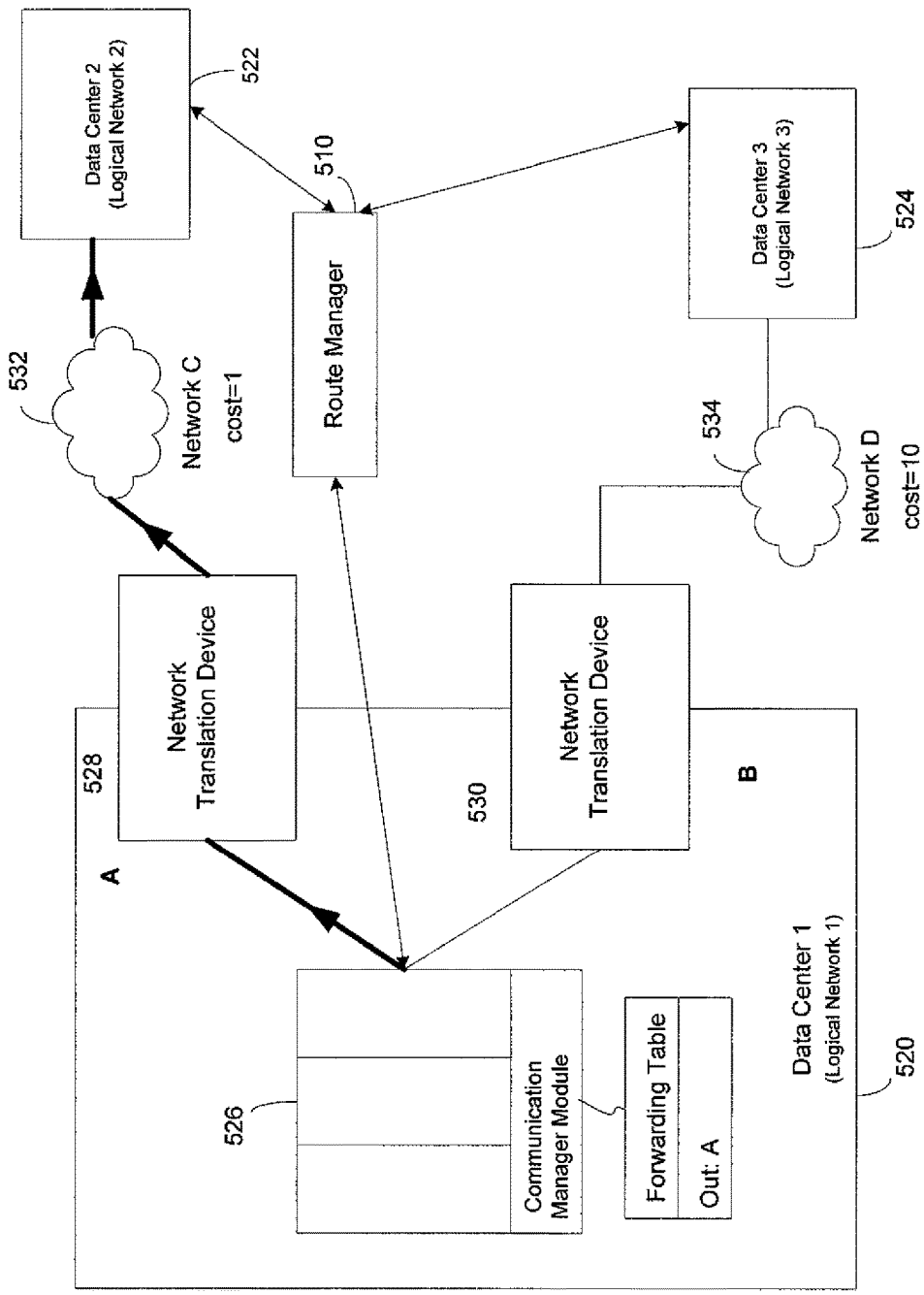

FIGS. 5A and 5B illustrate a virtual route selection propagated to the substrate network. FIG. 5A illustrates a virtual network topology where logical network 1 (LN1) 502 is connected to logical network 2 (LN2) 504 and logical network 3 (LN3) 506 by a logical router 508. The current preferred routing path specified by the user is from LN1 to LN2.

A user may wish to specify a route for various reasons. For example, routing costs through LN2 can be cheaper than LN3, such as when LN2 and LN3 are in different locations with different ISPs and one ISP charges lower rates than another. In another example, LN3 can be a backup virtual network for LN2, and used only in some situations, such as for handling overflow from LN2.

Referring back to FIG. 5A, the user can specify preferred routes through the virtual network and/or characteristics or costs associated with the virtual components, such as monetary costs, packet loss rates, reliability rate, and/or other metrics. These characteristics can be assigned to the virtual components, such as the virtual computing nodes, node links, logical routers/switches or the like. The Route Manager 510 can then determine routing tables 512 and/or forwarding tables 514 for the virtual network.

FIG. 5B illustrates an example of a substrate route that can correspond to the virtual route in FIG. 5A. In the figure, there are three data centers 520, 522, 524 corresponding to the logical networks 502, 504, 506 of FIG. 5A. In data center 1 (DC1), a computing node 526 is connected to a network translation device A (NTD A) 528 and a network translation device B (NTD B) 530. The network translation devices are connected to external networks C 532 and D 534, respectively.

The network translation devices can serve as a gateway or entry/exit point into the virtual network. In some embodiments, the network translation devices can translate between a first addressing protocol and a second addressing protocol. For example, if the virtual network is using IPv6 and the external networks are using IPv4, the network translation devices can translate from one addressing protocol to the other for traffic in either direction. In one embodiment, users connect from their private networks to the data centers via a VPN or other connection to a network translation device, which translates and/or filters the traffic between networks.

Referring back to FIG. 5B, network C 532 connects data center 2 522 to NTD A 528. Network D 534 connects data center 3 524 to NTD B 530. The Route Manager module 510 is in communication with data center 1 520, data center 2 522, and data center 3 524, particularly with the Communication Manager for the computing node 526.

From information associated with the virtual network, the Route Manager 510 can determine that the user wants to route traffic from LN1 to LN2. The Route Manager can then "favor" substrate routes associated with the LN1 to LN2 virtual path. For example, the Route Manager can specify a low routing cost (e.g. cost 1) for communications, such as data packets, travelling on Network C relative to Network D (e.g. cost 10) such that during route determination, routes through Network C are favored. In one embodiment, the Route Manager can apply a coefficient to stored substrate costs in order to favor one route over another. In another example, explicit routing paths can be set up corresponding to the virtual route. The Route Manager can identify routes in its routing table and communicate those routes with one or more Communication Managers.

Referring back to FIG. 5B, when the computing node 526 receives or generates a packet destined for LN2 or a network reachable from LN2, the computing node can be configured by the Route Manager to send packets through NTD A 528 as it lies on the route including network C 532.

By propagating virtual network configuration data to the substrate, and using that configuration data in substrate route calculation, a mechanism is provided for a virtual network user to affect substrate routing. In some embodiments, the virtual configuration data can be used in determining association of the virtual components with the substrate components. For example, components of the same virtual network can be associated with the same substrate computing node or on computing nodes connected to the same switch in order to minimize or otherwise improve substrate network traffic. Configuration data can also be provided the other way and, in some embodiments, the user and/or virtual network can be provided with additional substrate information, such as characteristics of the underlying associated substrate components (e.g. performance, costs) in order to make more informed routing decisions.

Figure 6:
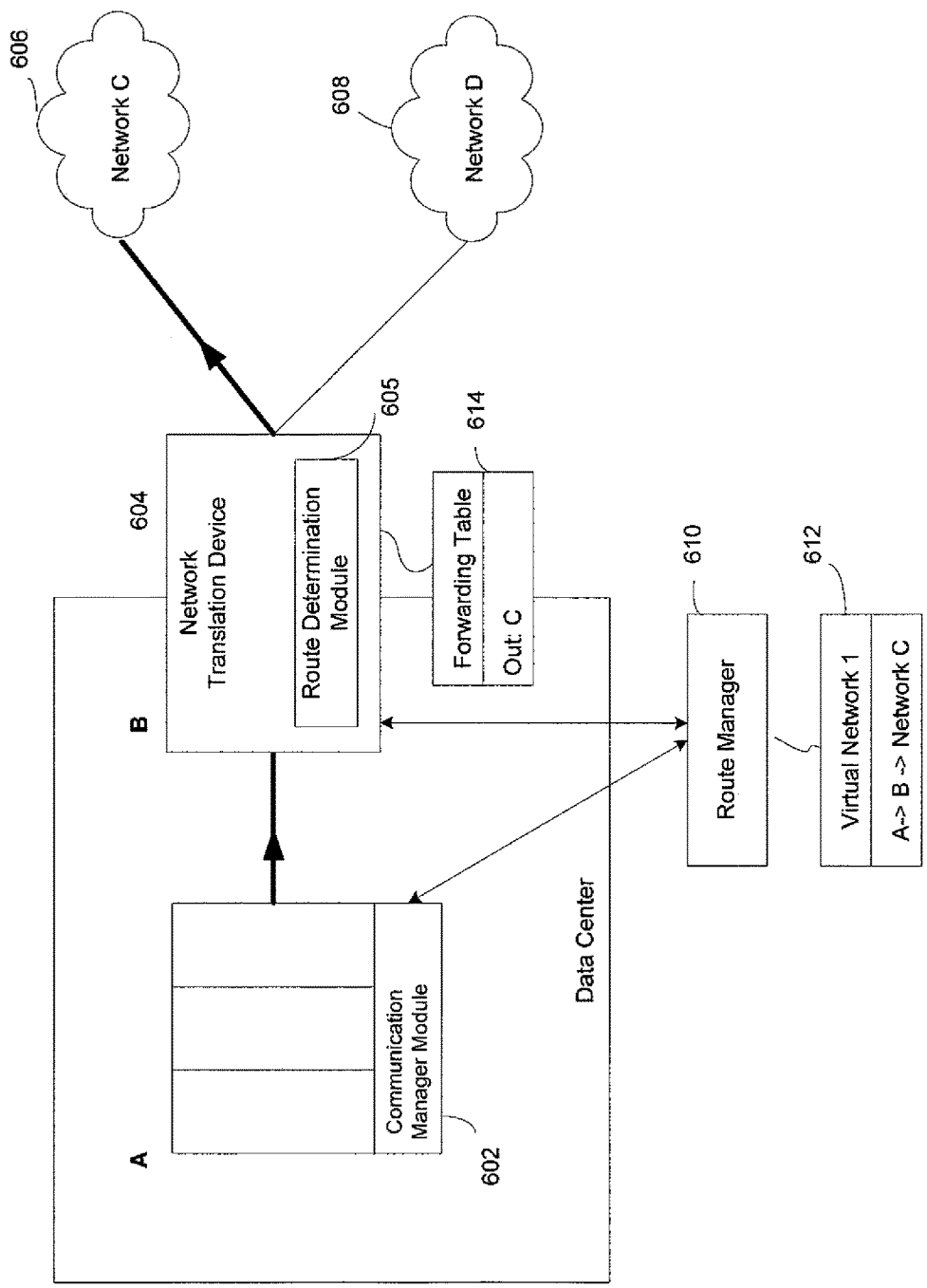
FIG. 6 is a block diagram of the substrate network of FIG. 1 illustrating the determination of routes into or out of a virtual network by network translation device.

FIG. 6 illustrates an example substrate network wherein a network translation device determines routes into or out of a virtual network. In FIG. 6, a communication, such as a data packet, leaves computing node A, which is associated with a virtual network, through NTD B 604. The network translation device can include a Route Determination module 605 for determining the packet route. NTD B is connected to network C 606 and network D 608.

In FIG. 6, the Route Manager 610 receives a network configuration or determines that route A-B-C is preferred or has a cheaper cost. The Route Manager can store the route in a routing table 612. The Route Manager can then send forwarding entries to the NTD B 604 that configure it to send traffic through network C 606. NTD B can contain multiple forwarding entries for multiple virtual networks, such that data for one virtual network can be sent through network C, while another virtual network sends data through network D. In some cases, network packets with the same source and/or destination are sent by different networks based on the associated virtual network.

In some embodiments, the substrate component may not have a Communication Manager or a Route Determination module and other ways of coordinating routing can be used. For example, a substrate component, such as an ordinary router or a network translation device, can be set up multiply on separate paths. Using blacklists, network traffic for a particular virtual network can be allowed on one path but blocked on others. The Route Manager can send a control signal or message updating the blacklists to manage the data flow.

In other embodiments, substrate components can implement IP aliasing, where, for example, "fast" path packets use one set of IP addresses, while "slow" path packets use another set of IP addresses. When the substrate component receives the packet, it can determine which path to use based on the IP address. The Route Manager can send a control signal or message to assign IP addresses to the components based on the type of traffic handled.

Other ways of differentiating how packets are handled by substrate components include: tagging of packets, such as by Multiprotocol Label Switching (MPLS); MAC stacking where a packet could have multiple MAC addresses, the first MAC address for a substrate component, such as a switch, and a second MAC address for a next component either on the "fast" or the "slow" path; and using Network Address Translation (NAT) devices on both ends of a network in order to redirect traffic into the network, such as by spoofing or altering an destination address for an incoming packing and/or altering an the source address of an outgoing packet. In some embodiments, the Route Manager generates control signals or messages for coordinating traffic on the substrate network for the various techniques described above.

Virtual Network Route Selection Process

Figure 7A:
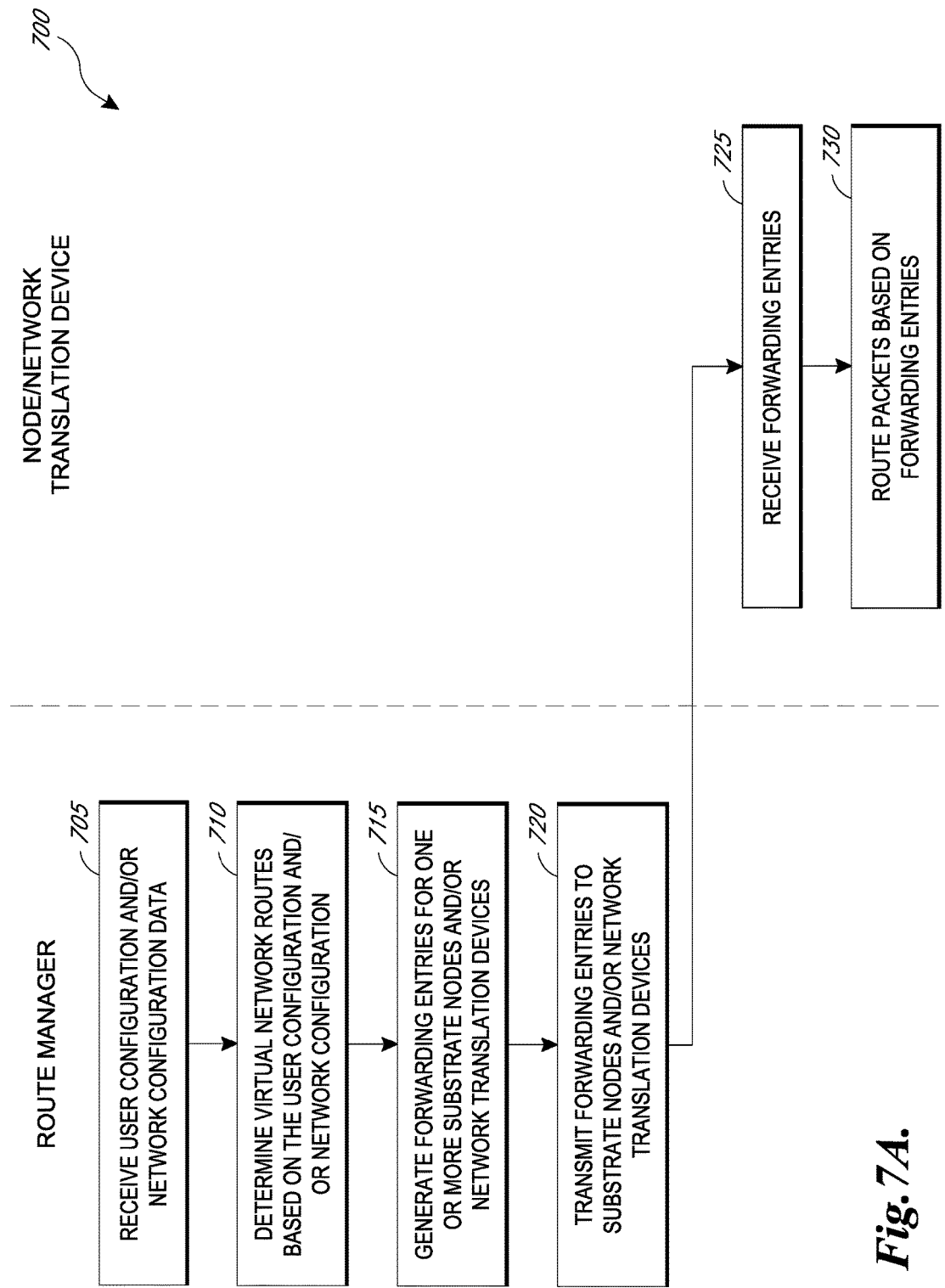
FIG. 7A illustrates a flow diagram for a process of propagating virtual routes to a substrate network.

FIG. 7A illustrates a flow diagram for a process 700 of propagating virtual routes to a substrate network usable in the example networks described above. The virtual routes can be based on network configuration data provided by a virtual network user, such as costs, component characteristics, preferred routes, and/or the like.

At block 705, the Route Manager module receives user configuration and/or network configuration data, such as, for example, policy based routing decisions made by the user. In some embodiments, a user interface is provided, allowing a user to specify configuration data. The Route Manager can receive the configuration data from a data store, for example, if user configuration and/or network configuration data are stored on the data store after being received on the user interface or otherwise generated. In some embodiments, the configuration data can include explicit routing paths through the virtual network. In some embodiments, the configuration data can specify associated costs for traversing components of the virtual network, such as links and/or nodes. These costs can be based on monetary costs, packet loss rates, reliability rate, and/or other metrics. These costs can be provided by the user to configure the virtual network provided by the data center operator. However, costs and other network configuration data can come from the data center operator themselves in addition to or instead of from the user. For example, the data center operator can use the virtual network to provide feedback to the user on routing costs, such as by associating monetary use costs for the substrate computing nodes and/or components. In one example, the data center operator can specify a high cost for a high speed network link or high powered computing node so that the virtual network user can take into account that cost in configuring the virtual network.

At block 710, the Route Manager module determines virtual network routes based on the user configuration and/or network configuration data. In some embodiments, routing protocols or the route determination algorithms of the routing protocols, such as BGP, OSPF, RIP, EIGRP or the like, can be used to determine virtual routes.

At block 715, the Route Manager determines one or more forwarding entries for substrate network components, such as computing nodes, network translation devices, or the like. As the Route Manager can determine routing paths and propagate routing decisions to the substrate components, the Route Manager can coordinate routing within a data center and/or between multiple data centers.

At block 720, the Route Manager transmits the forwarding entries to the substrate components. At block 725, the substrate component receives the forwarding entries. The substrate network components can store the forwarding entries in FIB tables or similar structures. Generally, a Communication Manager on the substrate component receives and processes the forwarding entry and manages communications of the substrate component.

However, as discussed above, network traffic can also be coordinated for substrate components without a Communication Manager using instead, for example, a NAT device or the like. In some embodiments, the Route Manager can send blacklist updates, manage tagging of the packets, generate stacked MAC addresses, or the like.

At block 730, the substrate components route packets received or generated according to the stored forwarding entries. Generally, a Communication Manager on the substrate component manages the packet routing and refers to the forwarding entries to make forwarding decisions.

Substrate Network Route Selection Process

Figure 7B:
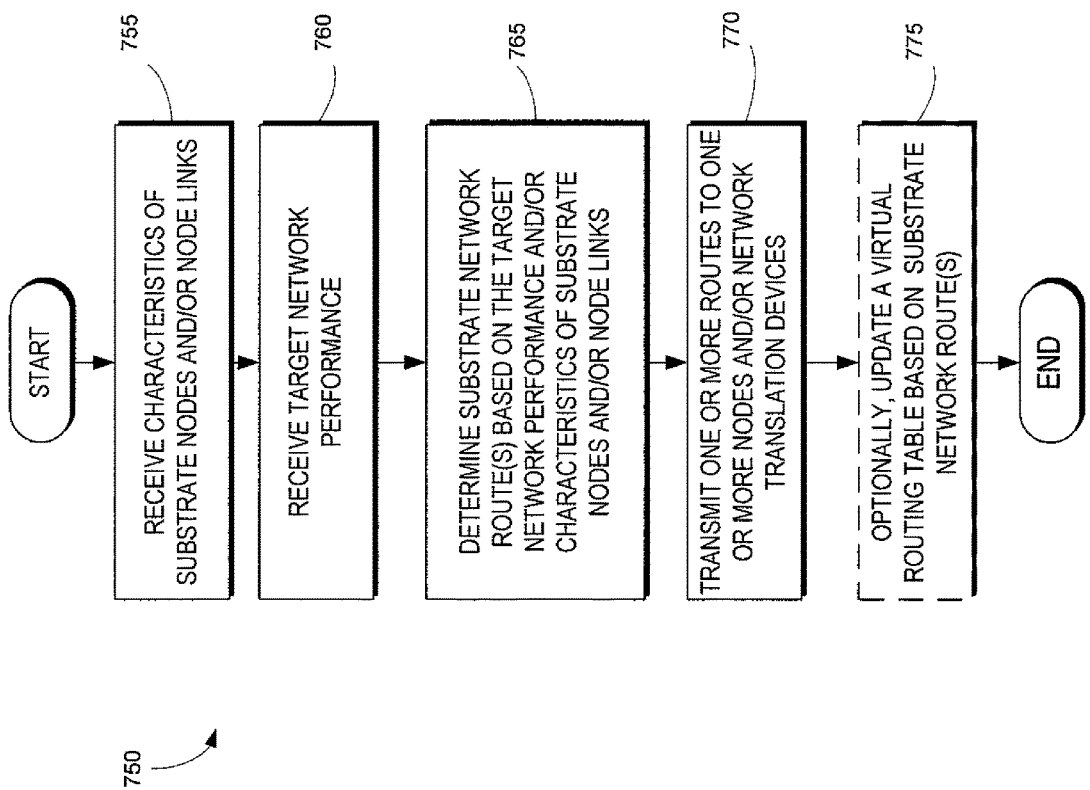
FIG. 7B illustrates a flow-diagram for a process of determining substrate routing based on target performance characteristics of the associated virtual network.

FIG. 7B illustrates a flow-diagram for a process 750 for determining substrate routing based on target performance characteristics of the associated virtual network usable in the example networks described above. In some instances, the Route Manager can optionally generate a virtual routing table for the virtual network before determining substrate routing. The virtual routing table can be used to determine virtual routing paths, allowing optimization of network traffic by selective association of the virtual network components with substrate computing nodes, such as by taking into account physical location and virtual network traffic patterns. However, generation of the virtual routing table is not necessary as the substrate routes can be determined independently of the virtual routes, as will be described below. In addition, user configuration and/or network configuration data provided by the user can be used to describe the virtual network, without needing to generate a virtual routing table.

At block 755, the Route Manager receives characteristics of the substrate nodes and/or node links. The Route Manager can receive the characteristics data from a data store. In some embodiments, a user interface is provided, allowing a user to specify characteristics data. The characteristics can describe such things as monetary costs, network bandwidth, network security, network latency, network reliability and/or the like. These characteristics can be used in a cost function for determining substrate routing paths. This information can be kept by the Route Manager or data source accessible by the Route Manager.

At block 760, the Route Manager receives a target network performance for the virtual network. The target performance can be based on a purchased service level by the user, user history, security data or the like. For example, a service level purchased by a user can have minimum bandwidth, latency, or quality of service requirements. In another example, a user can be a new customer with an unknown payment history such that the user is provisioned on a "slow" virtual network in order to minimize incurred expenses in case the user fails to pay. In another example, a user identified as carrying dangerous or prohibited traffic, such as viruses, spam or the like, can be quarantined to particular substrate components. During quarantine, the virtual network components can be assigned to specialized substrate components with more robust security features. For example, the substrate components can have additional monitoring functionally, such as a deep-packet scanning ability, or have limited connectivity from the rest of the substrate network.

At block 765, the Route Manager determines substrate network routes based on the target network performance and/or characteristics of the substrate nodes and/or links. In one embodiment, the Route Manager can use the characteristic data in a cost function for determining routes. Which characteristic to use or what level of service to provide can be determined by the performance criteria or target performance? For example, for a "fast" route, the Route Manager can use bandwidth and/or latency data for the substrate network to generate routes that minimize latency, maximize available bandwidth, and/or otherwise improve network performance.

The Route Manager can re-determine routes as needed based on changes in the network, the configuration data, and/or the performance level. For example, if a user has purchased N gigabits of "fast" routing but has reached the limit, the Route Manager can generate new routes and shift the user to "slow" routing.

At block 770, the Route Manager transmits forwarding entries for one or more routes to one or more nodes and/or network translation devices. In some embodiments, the Route Manager determines forwarding entries for the substrate components and sends those forwarding entries to the substrate components on the path. In some embodiments, the Route Manager can send blacklist updates, manage tagging of data packets, and/or generate stacked MAC addresses.

At block 775, the Route Manager can optionally update the virtual routing table based on substrate network routes. By changing the virtual network routing table based on the substrate routes, the virtual network can stay logically consistent with the behavior of the substrate network. Thus, users won't necessarily be confused by discrepancies in the virtual routing.

Management of Communications Associated with Hosted Virtual Machine Networks

Figure 8:
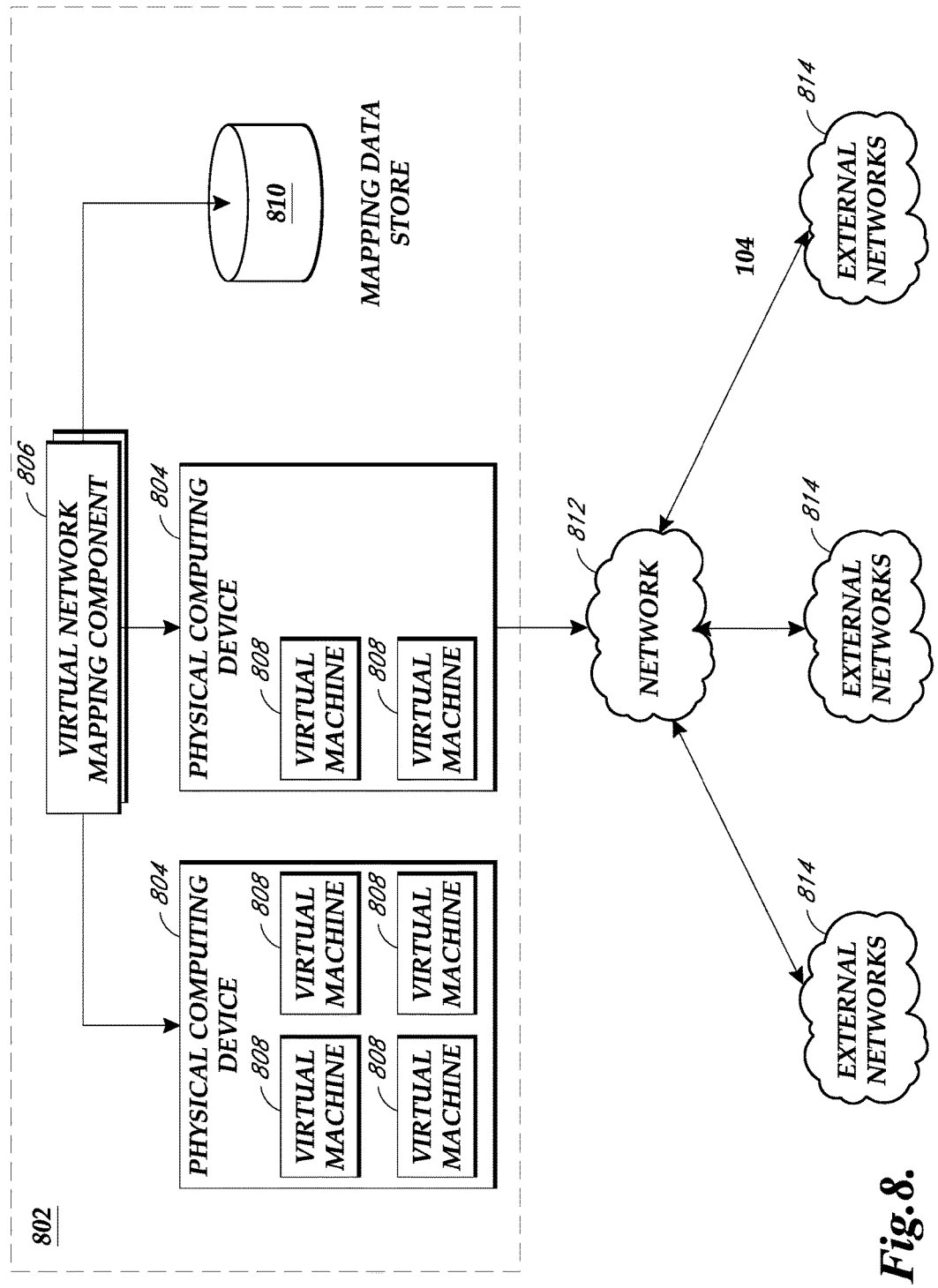
FIG. 8 is a simplified block diagram of the substrate network of FIG. 1 illustrating hosted virtual machine networks including a number of physical computing devices and a virtual network mapping component.

With reference now to FIGS. 8-12, various embodiments for the management of communications associated with virtual machine instances and hosted virtual machine networks will be described. As previously described in FIG. 1 and as illustrated in FIG. 8, the substrate network 802 includes a number of physical computing systems 804 that host one or more virtual machine instances 808. As will be explained in greater detail, the number of virtual machine instances hosted on each physical computing system 804 can vary according to the computing device resources associated with each individual physical computing system 804 and in accordance with the management policies of the substrate network 102. A collection of one or more virtual machine instances can correspond to various components of a hosted virtual network. The hosted virtual network is typically logically configured according to client specifications and implemented on the substrate network 802.

As previously described, the substrate network 802 also includes a virtual machine manager component, such as ONM system manager 110 (FIG. 1), for managing the allocation of virtual machine instances 808 on the various physical computing systems 804. In one embodiment, the hosted virtual machine instances can be configured in a manner to logically represent a network of virtual machine instances, generally referred to as a hosted virtual machine network. One skilled in the relevant art will appreciate that illustrative interaction and communications may include, or otherwise involve, additional components not illustrated in the illustrative drawing figures. For example, for purposes of the FIGS. 8-10, however, the ONM system manager component 110 is not illustrated.

With continued reference to FIG. 8, the substrate network 802 includes two or more virtual network mapping components 806 for facilitating communications between hosted virtual networks and routing components of the communication network 812. In one aspect, the virtual network mapping components 806 can communicate with hosted virtual network components in accordance with an established virtual network communication protocol utilized by the substrate network 802. In another aspect, the virtual network mapping components 806 can communicate with at least a portion of the router components of the communication network 812 that facilitate communication to external networks/computing devices 814 in accordance with an establish router communication protocol. Illustratively, each virtual network mapping component 806 can be configured to communicate with the routing components in accordance with known routing protocols such as the Border Gateway Protocol (BGP). Additionally, the virtual network mapping component 806 can be configured to communicate with hosted virtual networks via known communication protocols, such as the Multi-Protocol Label Switching (MPLS) communication protocol. The virtual network mapping component 806 can generate mapping information that correlates communications pursuant to the router communication protocol with communications pursuant to the virtual network communication protocol and vice versa. The virtual network mapping component 806 can then configure various router components and virtual network components with the mapping information or provide mapping information as requested. Although the substrate network 812 is illustrated as including two virtual network mapping components 806, the substrate network 812 can include any number of virtual network mapping components 806.

With continued reference to FIG. 8, the substrate network 102 can further include a mapping data store 810 for maintaining mapping information between various network nodes associated with a hosted virtual node and routing components of the communication network 812. The mapping data store 810 may correspond to network attached storage (NAS), database servers, which may be implemented in a centralized or distributed manner.

Figure 9:
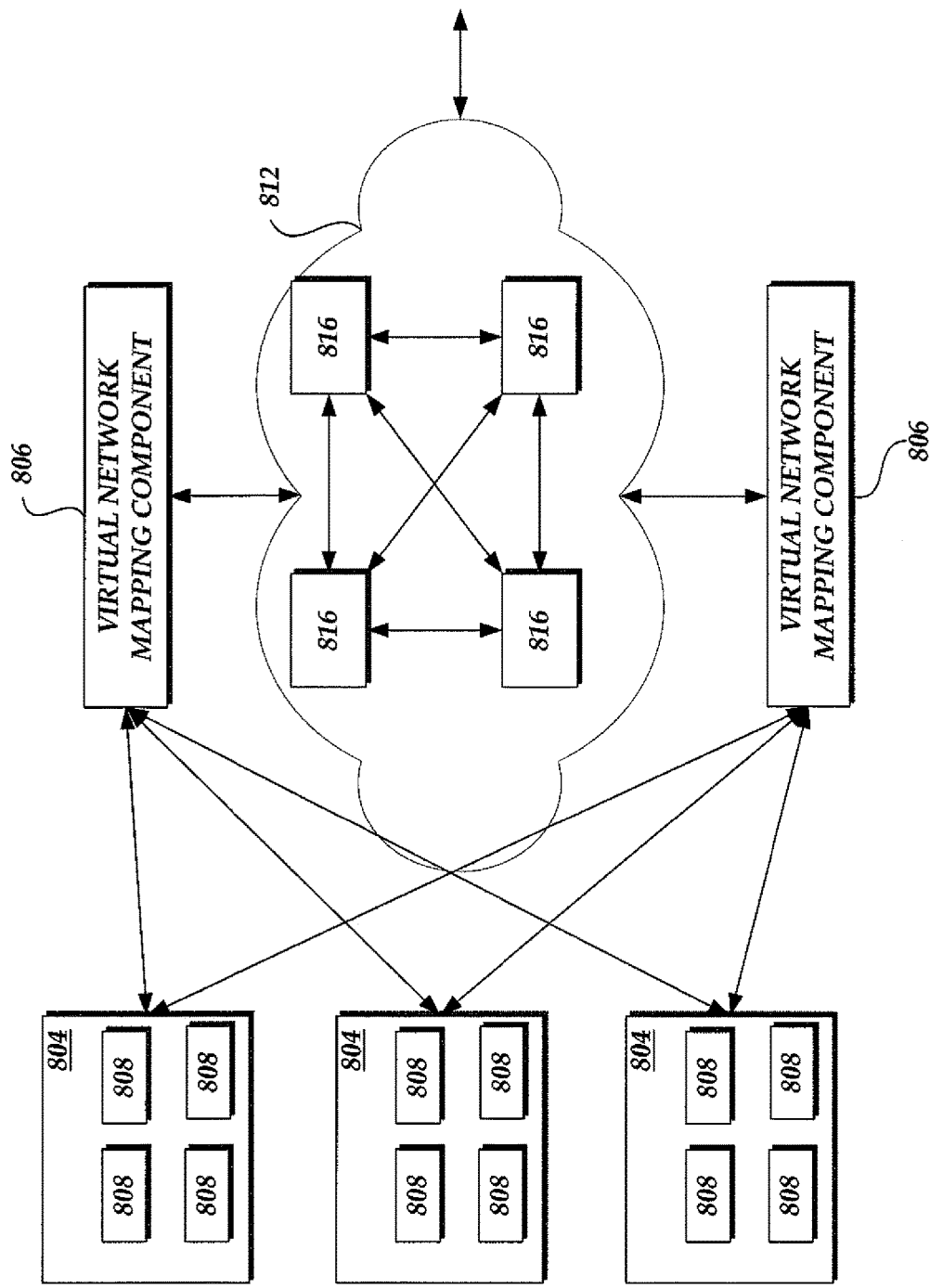
FIG. 9 is a simplified block diagram of the substrate network of FIG. 1 illustrating including a number of physical computing devices and a virtual network mapping component in communication with routers corresponding to a communication network.

With reference now to FIG. 9, in one embodiment, the virtual network mapping components 806 are arranged in a manner to facilitate communication with the hosted virtual networks made up of virtual machine instances 808 hosted on physical machines 804. The hosted virtual network utilizes a virtual network communication protocol to facilitate communication between the various virtual components of the hosted virtual network, to facilitate interaction with other hosted virtual networks and to facilitate communication to external networks. As previously described, in one embodiment, the hosted virtual network components can utilize MPLS. In an illustrative embodiment, communications from the hosted virtual networks to external networks are facilitated via the communication network 812, which includes various hardware components, such as routers 816. Each virtual network mapping component 806 is in communication with at least a subset of the routers 806 in accordance with a router communication protocol. As previously described, in one embodiment, the router communication protocol can correspond to BGP. To facilitate communications between the router components 816 and the hosted virtual network components (e.g., virtual machines 808), the virtual network mapping component 806 generates and provides mapping information to facilitate the exchange of data packets between the hosted virtual networks and external networks. In embodiment, the virtual network mapping component 806 can provide mapping information or configure routing components/hosted virtual network components with the mapping information. In another embodiment, the virtual network mapping component 806 can also provide the mapping information on request without requiring the components of the hosted virtual network to maintain routing information necessary to facilitate communications to the external networks 814.

Illustratively, the configuration of the virtual network mapping component 806 may correspond to an assignment of a virtual network mapping component 806 to a subset of the hosted virtual networks of the substrate network 802. Additionally, the configuration of the virtual network mapping components 806 may correspond to an assignment of at least a subset of the routers 816 of the communication network 802. Additionally, one or more virtual network mapping components 806 may be configured to provide for redundancy or overlap such that communications are maintained.

Figure 10A:
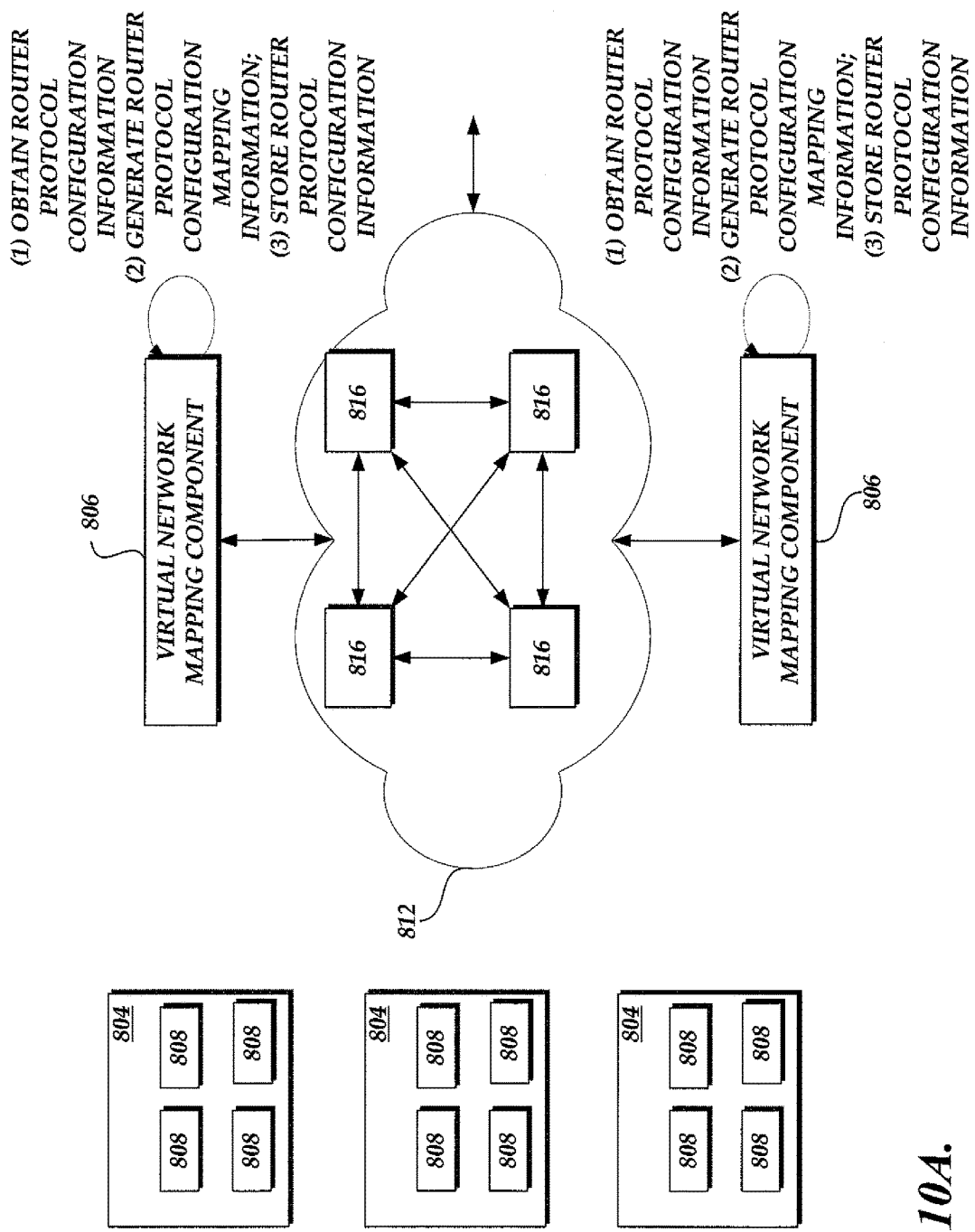
FIGS. 10A-10C are block diagrams of the simplified substrate network of FIG. 1 illustrating hosted virtual machine networks exchanging information with external networks via a virtual network mapping component.
Figure 10B:
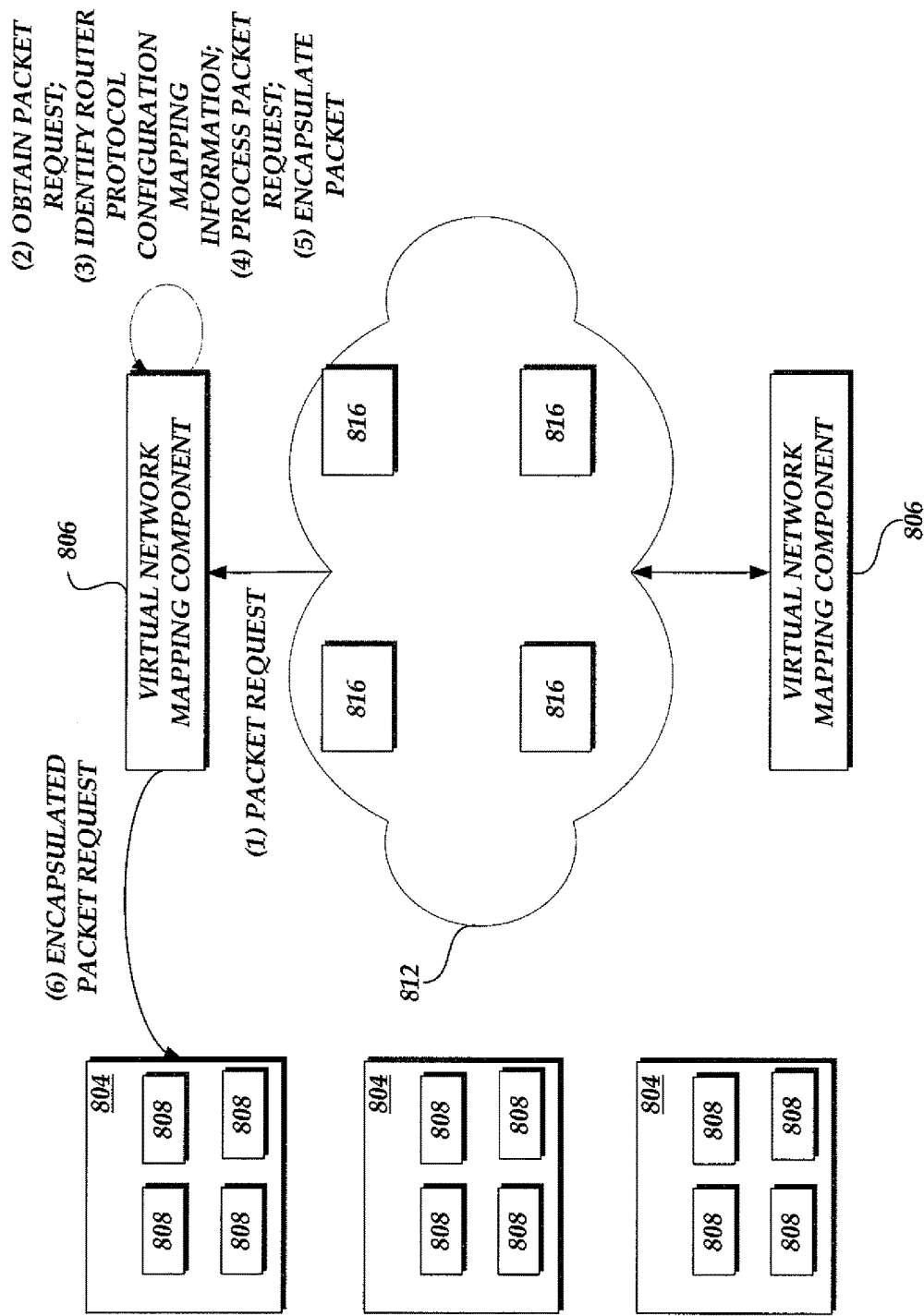
Figure 10C:
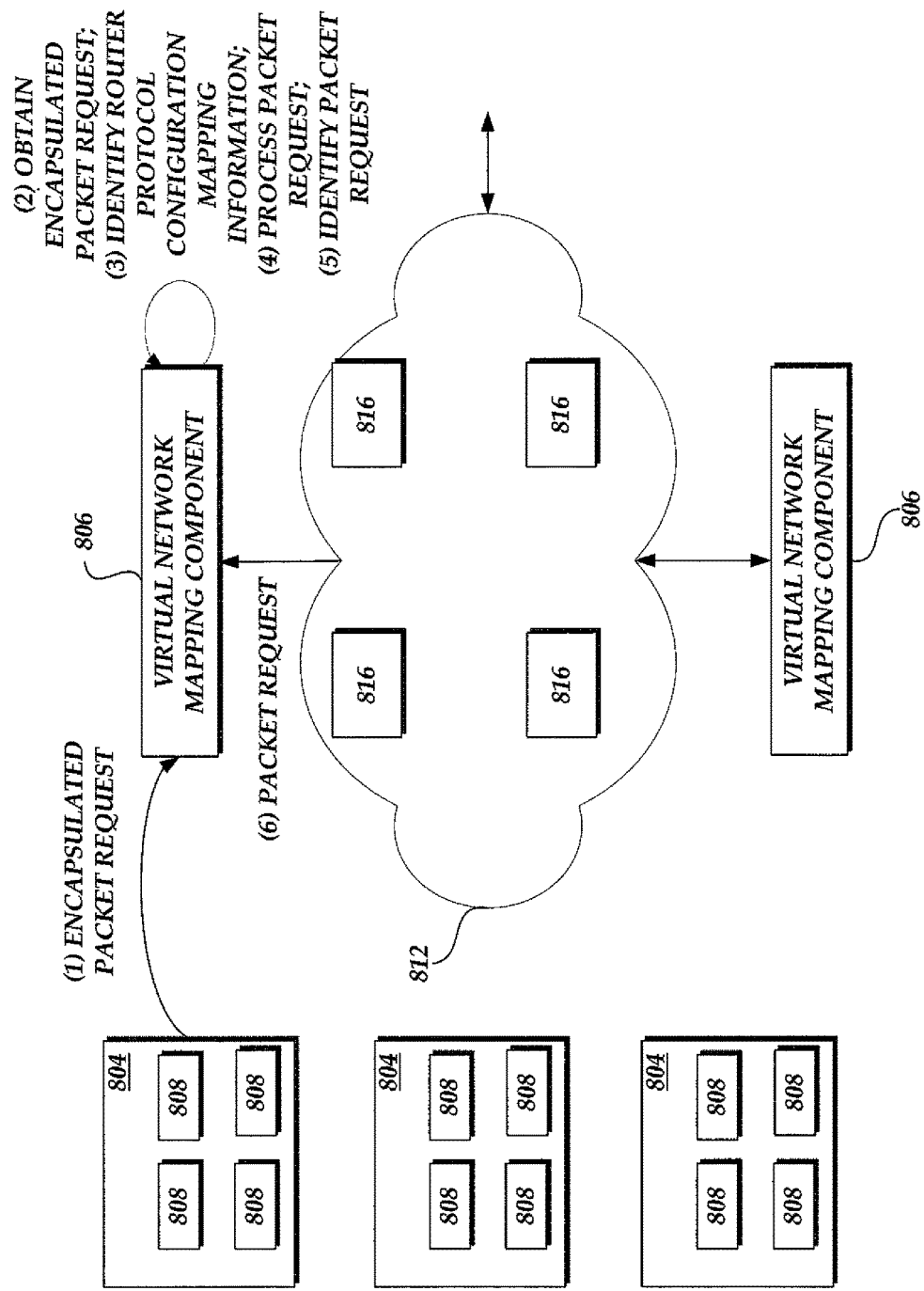

Referring now to FIGS. 10A-10C, the illustrative configuration of communications between hosted virtual machine networks and external networks via the virtual network mapping component 806 will be described. With reference to FIG. 10A, one or more of the virtual network mapping components 806 can be configured to maintain mapping information (via the mapping data store 810). Specifically, the virtual network mapping components 806 obtain routing protocol configuration information associated with one or more routing components 816 of the communication network 812, such in accordance with routing protocols, such as BGP. In one embodiment, each virtual network mapping component 806 forms a mesh network with at least a subset of the routers in accordance with BGP routing information. Based on the routing protocol configuration information, the virtual network mapping component 806 then generate or obtain mapping information for facilitating communication with hosted virtual machine network nodes in accordance with a routing protocol utilized by the hosted virtual machine networks. By way of illustrative examples, the mapping information can correspond to information facilitating the translation of customer subnet, routing target, border router IP address and VPN label information associated with the router components 816 and network update type message identifier, border router substrate IP address, customer subnet and MPLS label information by utilization of the mapping information associated with hosted virtual network components. The virtual network mapping components 806 then store the mapping information in the mapping data store 810.

With reference to FIG. 10B, to facilitate the generation of incoming data packets (from the perspective of the hosted virtual network), the virtual network mapping component 806 configures one or more of the router components 816 with the mapping information. Illustratively, the mapping information provides the router components with the information required by the router components to direct data communications to hosted virtual network components, such as by encapsulation. The incoming data packet is configured by the router components in accordance with the hosted virtual communication protocol. Thereafter, the router components 816 can directly transmit the encapsulated, or otherwise processed, data packets to the identified node of the hosted virtual network for further processing. As illustrated in FIG. 10B, the router components 816 did not need to establish communications with the hosted virtual network components to obtain the necessary virtual network communication protocol information to facilitate communicate directly (or indirectly) through the substrate network 802.

With reference to FIG. 10C, to facilitate the generation of outgoing data packets (from the perspective of the hosted virtual network), the virtual network mapping component 806 configures one or more of the hosted virtual network components with the mapping information. In one embodiment, the virtual network mapping component 806 can configure the hosted virtual network components asynchronous to any type of communication event. In another embodiment, the virtual network mapping component 806 can configure the hosted virtual network components synchronously to a communication event, such as upon receipt of a request for the mapping information as illustrated in FIG. 10C.

Regardless of whether the configuration of hosted virtual network components is synchronous or asynchronous, outgoing data packets are configured by the hosted virtual network components in accordance with the router communication protocol. Thereafter, the hosted virtual network components can directly transmit the encapsulated, or otherwise processed, data packets to the identified node of the hosted virtual network for further processing. As illustrated in FIG. 10C, the hosted virtual network components did not need to establish communications with the router components 816 to obtain the necessary virtual network communication protocol information to facilitate communicate directly (or indirectly) through the substrate network 802.

Figure 11:
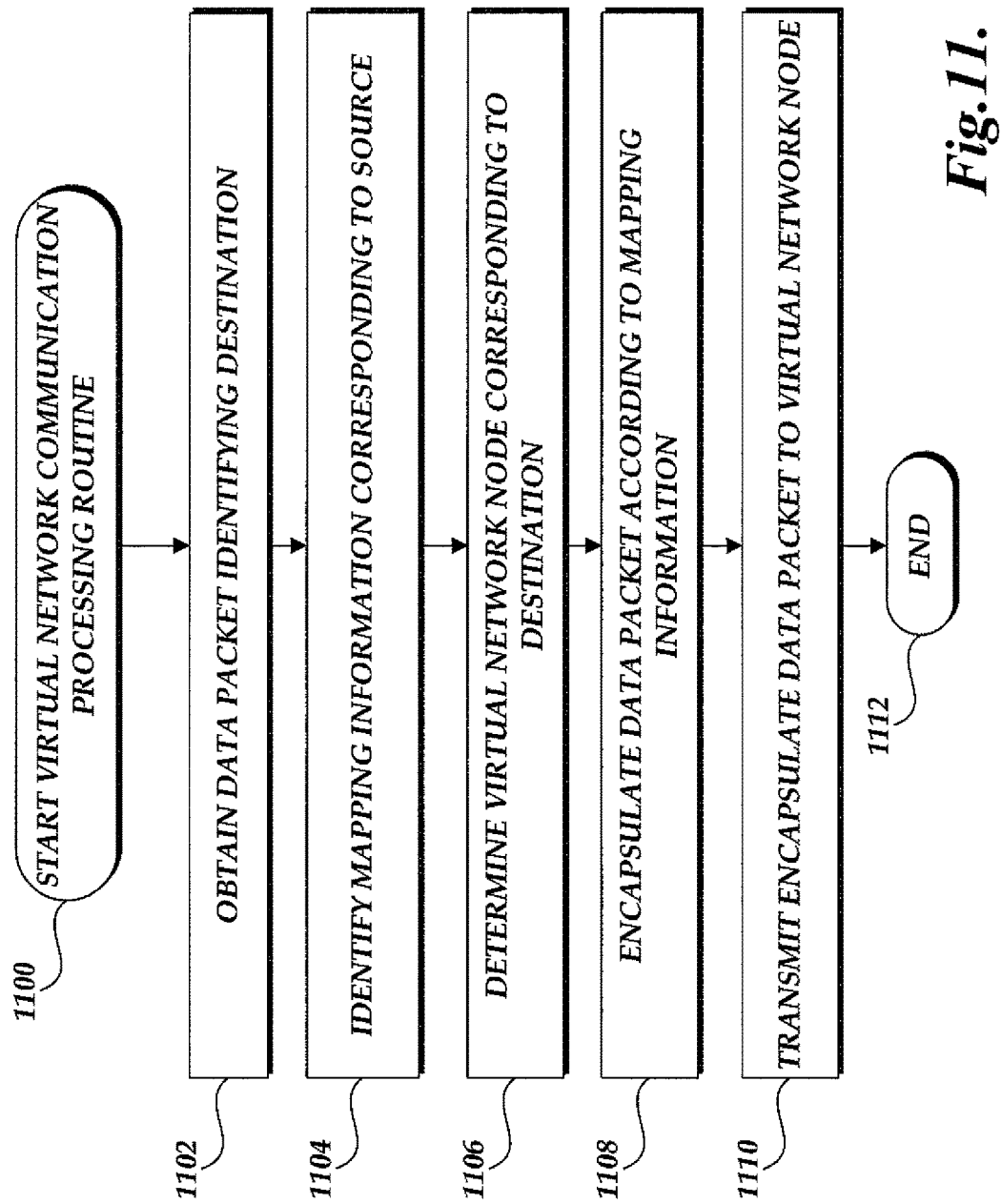
FIG. 11 is a flow diagram of a virtual network communication processing routing implemented by a virtual network mapping component.

Referring now to FIG. 11, a routine 1100 for facilitating the transmission of incoming data communications to a hosted virtual network will be described. At block 1102, the virtual network mapping component 806 obtains or identifies mapping information corresponding to the router communication protocol and the virtual network communication protocol. The virtual network mapping component 806 can store the mapping information in the mapping data store 810 or utilize previously mapped information as part of an updating process.

At block 1104, the virtual network mapping component 806 provides the mapping information to one or more router components 816 of a communication network 812. Illustratively, the virtual network mapping component 806 can configure the router components 816 in a way that allows the router components 816 to generate communications to various hosted virtual network components, such as via encapsulation in accordance with the hosted virtual network communication protocol. For example, in one embodiment, the router components would translate customer subnet, routing target, border router IP address and VPN label information associated with the router components 816 into network update type message identifier, border router substrate IP address, customer subnet and MPLS label information by utilization of the mapping information. At block 1106, the substrate network receives the encapsulated data packets from the router components 816 and utilizes the virtual network communication protocol to cause the data packets to be received at specific hosted virtual network components. At block 1108, the routine 1100 terminates.

Referring now to FIG. 12, a routine 1200 for facilitating the transmission of outgoing data communications from a hosted virtual network or hosted virtual network components will be described. At block 1202, the virtual network mapping component 806 identifies or obtains mapping information corresponding to the router communication protocol and the virtual network communication protocol. The virtual network mapping component 806 can store the mapping information in the mapping data store 810 or utilize previously mapped information as part of an updating process. At block 1204, the virtual network mapping component 806 can optionally receive a request from hosted virtual network component for the mapping information, which relates generally to a synchronous process. In an asynchronous process, block 1204 can be omitted.

At block 1206, the virtual network mapping component 806 provides the hosted virtual network components or a requesting hosted virtual network component with mapping information. Illustratively, the virtual network mapping component 806 can configure the hosted virtual network components in a way that allows hosted virtual network components to generate communications to various router components 816, such as via encapsulation in accordance with the router communication protocol. For example, in one embodiment, the hosted virtual network components would translate network update type message identifier, border router substrate IP address, customer subnet and MPLS label information associated with the hosted virtual network components into customer subnet, routing target, border router IP address and VPN label information by utilization of the mapping information. At block 1208, the substrate network receives the encapsulated data packets from hosted virtual network component and utilizes the router communication protocol to cause the data packets to be received at specific router communication components. At block 1210, the routine 1200 terminates.

It will be appreciated by one skilled in the relevant art that there are a number of ways to modify the routing information associated with requests from a class of client computing devices. It will further be appreciated by one skilled in the relevant art that the timing at which performance is monitored and updates to routing information are made can vary.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing hosted virtual machine networks comprising:
   a processor; and
   a memory operatively coupled to the processor, the memory including instructions that upon execution by the processor cause the system to:
   host a first virtual machine; and
   execute a virtual network mapping program, the virtual network mapping program configured to:
   obtain incoming and outgoing data communications between the first virtual machine and an external network, wherein the incoming data communications are received from the external network via a virtual private network (VPN) in accordance with a data communication protocol and the outgoing data communications are received from the first virtual machine in accordance with a virtual network communication protocol;

access mapping information corresponding to an association of the data communication protocol to the virtual network communication protocol, wherein each router in a plurality of routers provides a gateway between one virtual machine in a plurality of virtual machines and the external network, wherein the mapping information corresponds to a subset of routers in the plurality of routers, and wherein the mapping information facilitates a translation of VPN label information associated with at least one router in the subset of routers; and facilitate modification of the outgoing data communications for use by the first virtual machine using the mapping information.

2. The system of claim 1, wherein the data communication protocol corresponds to a border gateway protocol.

3. The system of claim 1, wherein the virtual network mapping program maps information to all routers in the plurality of routers.

4. The system of claim 1, further comprising a plurality of virtual network mapping components for processing communications between one or more virtual machines in the plurality of virtual machines and one or more routers in the plurality of routers.

5. The system of claim 4, wherein the plurality of virtual network mapping components map information to all routers in the external network.

6. The system of claim 1, wherein the virtual network mapping program is further configured to configure a first router in the plurality of routers with the mapping information to facilitate modification of the incoming data communications.

7. The system of claim 1, wherein the first virtual machine does not maintain information corresponding to the data communication protocol.

8. A system for managing hosted virtual machine networks comprising:

a processor; and a memory operatively coupled to the processor, the memory including instructions that upon execution by the processor cause the system to:

host a first virtual machine; and execute a virtual network mapping program, the virtual network mapping program configured to:

process at least one of incoming and outgoing data communications between the first virtual machine and an external network, wherein the incoming data communications are received from the external network via a virtual private network (VPN) in accordance with a data communication protocol and the outgoing data communications are received from the first virtual machine in accordance with a virtual network routing protocol;

provide mapping information corresponding to an association of the data communication protocol and the virtual network routing protocol, wherein each router in a plurality of routers provides a gateway between one or more virtual machines in a plurality of virtual machines and the external network, wherein the mapping information corresponds to a subset of routers in the plurality of routers, and wherein the mapping information facilitates a translation of VPN label information associated with at least one router in the subset of routers; and facilitate translation of the incoming data communications for use by a first router in the plurality of routers using the mapping information.

9. The system of claim 8, wherein the virtual network communication protocol corresponds to a multiprotocol label switching communication protocol.

10. The system of claim 8, wherein the virtual network mapping program maps information to all routers in the plurality of routers.

11. The system of claim 8, further comprising a plurality of virtual network mapping programs for processing communications between one or more virtual machines in the plurality of virtual machines and one or more routers in the plurality of routers.

12. The system of claim 8, wherein the virtual network mapping program is further configured to configure the first virtual machine with the mapping information to facilitate translation of the outgoing data communications.

13. The system as recited in claim 8, wherein the virtual network mapping program obtains the incoming and outgoing data communications between the first virtual machine and the external network.

14. The system as recited in claim 8, wherein the first virtual machine does not maintain information corresponding to the data communication protocol.

15. A method for managing hosted virtual machines comprising:

by execution of instructions on one or more hardware processors:

obtaining, by a hosted virtual network, at least one of incoming and outgoing data communications between a first virtual machine in a plurality of virtual machines and an external network, wherein the incoming data communications are received from the external network via a virtual private network (VPN) in accordance with a data communication protocol and the outgoing data communications are received from the first virtual machine in accordance with a virtual network routing protocol;

providing, by the hosted virtual network, mapping information corresponding to an association of the data communication protocol and the virtual network routing protocol, wherein the mapping information facilitates a translation of VPN label information associated with at least one router in the subset of routers; and translating data communications between the first virtual machine and the external network based on the mapping information, wherein each router in a plurality of routers provides a gateway between one virtual machine in the plurality of virtual machines and the external network, and wherein the mapping information corresponds to a subset of routers in the plurality of routers.

16. The method of claim 15, wherein the virtual network mapping component maps information to all routers in the plurality of routers.

17. The method of claim 15, wherein translating data communications based on the mapping information further comprises encapsulating the data communications in accordance with the virtual network routing protocol.

18. The method of claim 15, wherein translating data communications based on the mapping information further comprises de-encapsulating the data communications in accordance with the virtual network routing protocol.

19. The method of claim 15, wherein obtaining at least one of incoming and outgoing data communications between the first virtual machine and an external network includes obtaining the incoming and outgoing data communications between the first virtual machine and the external network.

20. The method of claim 15, wherein the first virtual machine does not maintain information corresponding to the data communication protocol.

\* \* \* \* \*